United States Patent
Taguchi et al.

(10) Patent No.: US 9,880,554 B2
(45) Date of Patent: Jan. 30, 2018

(54) MISRECOGNITION DETERMINATION DEVICE

(71) Applicant: TOYOTA JIDOSHA KABUSHIKI KAISHA, Toyota-shi, Aichi-ken (JP)

(72) Inventors: Koji Taguchi, Isehara (JP); Masaaki Yamaoka, Susono (JP); Tomoyuki Kuriyama, Hadano (JP); Akihisa Yokoyama, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/147,260

(22) Filed: May 5, 2016

(65) Prior Publication Data
US 2016/0327948 A1 Nov. 10, 2016

(30) Foreign Application Priority Data
May 8, 2015 (JP) .................. 2015-095728

(51) Int. Cl.
G05D 1/00 (2006.01)
G01C 25/00 (2006.01)
G05D 1/02 (2006.01)

(52) U.S. Cl.
CPC .......... *G05D 1/0077* (2013.01); *G01C 25/00* (2013.01); *G05D 1/0061* (2013.01); *G05D 1/0238* (2013.01); *G05D 1/0251* (2013.01); *G05D 1/0257* (2013.01); *G05D 1/0268* (2013.01); *G05D 1/0278* (2013.01)

(58) Field of Classification Search
CPC .. G05D 1/0077; G05D 1/0061; G05D 1/0238; G05D 1/0251; G05D 1/0257; G05D 1/0268; G05D 1/0278; G01C 25/00
See application file for complete search history.

(56) References Cited

U.S. PATENT DOCUMENTS

2013/0110343 A1  5/2013  Ichikawa et al.

FOREIGN PATENT DOCUMENTS

| JP | 2002-092796 A | 3/2002 |
| JP | 2003-182474 A | 7/2003 |
| JP | 2011-162132 A | 8/2011 |
| JP | 2013097714 A | 5/2013 |
| JP | 5382218 B2 | 10/2013 |
| JP | 2014-101068 A | 6/2014 |
| KR | 1020140082848 A | 7/2014 |
| WO | 2011/158347 A1 | 12/2011 |

*Primary Examiner* — Calvin Cheung
(74) *Attorney, Agent, or Firm* — Sughrue Mion, PLLC

(57) ABSTRACT

A misrecognition determination device is provided. The misrecognition determination device may be configured such that a plurality of traveling parameters that is used for driving control of a vehicle and is based on input data is calculated, a difference between each two of the plurality of traveling parameters is calculated, a weighting coefficient is calculated according to an orthogonality between each two pieces of input data in a traveling situation of the vehicle, and a determination is made whether misrecognition has occurred in a parameter group, which includes the plurality of traveling parameters, using the values each generated by multiplying the difference by the weighting coefficient.

10 Claims, 8 Drawing Sheets

MISRECOGNITION DETERMINATION DEVICE

CROSS-REFERENCE TO RELATED APPLICATIONS

This application claims priority to Japanese Patent Application No. 2015-095728, filed on May, 8, 2015 in the Japanese Patent Office, the disclosure of which, including the specification, drawings and abstract, is incorporated herein by reference in its entirety.

BACKGROUND

1. Field

Apparatuses and methods consistent with the present disclosure relate to a misrecognition determination device.

2. Description of Related Art

Conventionally, a device that performs vehicle control using a plurality of sensors is known such as that described in Japanese Patent Application Publication No. 2003-182474 (JP 2003-182474 A). This device, with a plurality of sensors mounted on a vehicle, performs vehicle control based on the input data detected, not by a single sensor, but by a plurality of sensors.

However, even if data received from a plurality of types of sensors is used to calculate a plurality of traveling parameters that will be used for the traveling control of a vehicle, misrecognition may occur in the traveling parameters, calculated from a plurality of types of sensors, at the same time depending upon a traveling state of the vehicle. For example, when the traveling parameters are calculated using input data received from a camera-based image sensor, a radar sensor, and a GPS sensor, and if a vehicle, which is traveling in a tunnel, cannot recognize a white line due to a backlight near the exit of the tunnel and, in addition, cannot receive the GPS reception signal, there is a possibility that the traveling parameter based on the input data received from the image sensor and the traveling parameter based on the input data received from the GPS sensor are misrecognized at the same time.

SUMMARY

An aspect of an exemplary embodiment provides a misrecognition determination device that can accurately determine whether misrecognition occurs in a parameter group that includes a plurality of traveling parameters calculated based on input data.

That is, a misrecognition determination device according to an aspect of an exemplary embodiment includes a traveling parameter calculator that calculates at least a first traveling parameter that is used for driving control of a vehicle and is based on a first input data, a second traveling parameter that is used for driving control of the vehicle and is based on a second input data, and a third traveling parameter that is used for driving control of the vehicle and is based on a third input data; a difference calculator that calculates at least a first difference that is a difference between the first traveling parameter and the second traveling parameter, a second difference that is a difference between the first traveling parameter and the third traveling parameter, and a third difference that is a difference between the second traveling parameter and the third traveling parameter; a weight setter that sets at least a first weighting coefficient, a second weighting coefficient, and a third weighting coefficient, the first weighting coefficient corresponding to an orthogonality between the first input data and the second input data in a traveling situation of the vehicle, the second weighting coefficient corresponding to an orthogonality between the first input data and the third input data in the traveling situation of the vehicle, and the third weighting coefficient corresponding to an orthogonality between the second input data and the third input data in the traveling situation of the vehicle, such that a higher weighting coefficient corresponds to a higher orthogonality; and a determiner that calculates a first value generated by multiplying the first difference by the first weighting coefficient, a second value generated by multiplying the second difference by the second weighting coefficient, and a third value generated by multiplying the third difference by the third weighting coefficient; and determines whether a misrecognition has occurred in a parameter group that includes at least the first traveling parameter, the second traveling parameter, and the third traveling parameter using the first value, the second value, and the third value. According to this misrecognition determination device, the higher the orthogonality between different input data in a traveling situation of the vehicle is, the larger is set the weighting coefficient and, using the values each generated by multiplying the difference between traveling parameters based on the input data by the weighting coefficient, the determination is made whether misrecognition occurs in the plurality of traveling parameters. Therefore, the weighting coefficients can be set considering that the input data, which differ among the traveling situation of the vehicle, is difficult to be misrecognized at the same time. This allows the misrecognition of traveling parameters to be determined accurately.

According to an aspect of an exemplary embodiment, the weight setter may further reset at least one of the first weighting coefficient, the second weighting coefficient, and the third weighting coefficient in response to a manual driving switching operation being performed during driving control of the vehicle. In this case, when the manual driving switching operation is performed during the driving control of the vehicle, at least one of the first weighting coefficient, second weighting coefficient, and third weighting coefficient is reset so that the determiner can determine more easily that misrecognition occurs than when the manual driving switching operation is not performed. As a result, when the manual driving switching operation is performed and there is a possibility that the driving control is not performed as intended by the driver, the determiner can determine more easily that misrecognition occurs in the traveling parameter group. Therefore, the misrecognition determination of the traveling parameters can be made more accurately according to the traveling situation.

According to an aspect of an exemplary embodiment, the determiner may determine whether a sum of the first value, the second value, and the third value is less than a predetermined threshold, and in response to determining that the sum of the first value, the second value, and the third value is less than the predetermined threshold, the determiner may determine that the misrecognition has occurred in the parameter group that includes at least the first traveling parameter, the second traveling parameter, and the third traveling parameter. In this case, if the sum of the value generated by multiplying the first difference by the first weighting coefficient, the value generated by multiplying the second difference by the second weighting coefficient, and the value generated by multiplying the third difference by the third weighting coefficient is not smaller than the pre-set threshold, the determination may be made that misrecognition has occurred in the parameter group that includes at least the first traveling parameter, the second traveling parameter, and the third traveling parameter.

According to an aspect of an exemplary embodiment, the traveling parameter calculator may calculate a fourth traveling parameter, used for driving control of the vehicle, based on a fourth input data, the difference calculator may calculate at least the first difference, the second difference, the third difference, a fourth difference that is a difference between the first traveling parameter and the fourth traveling parameter, a fifth difference that is a difference between the second traveling parameter and the fourth traveling parameter, and a sixth difference that is a difference between the third traveling parameter and the fourth traveling parameter, the weight setter may set at least the first weighting coefficient, the second weighting coefficient, the third weighting coefficient, a fourth weighting coefficient corresponding to an orthogonality between the first input data and the fourth input data in the traveling situation of the vehicle, a fifth weighting coefficient corresponding to an orthogonality between the second input data and the fourth input data in the traveling situation of the vehicle, and a sixth weighting coefficient corresponding to an orthogonality between the third input data and the fourth input data in the traveling situation of the vehicle, and the determiner may calculate a fourth value generated by multiplying the fourth difference by the fourth weighting coefficient, a fifth value generated by multiplying the fifth difference by the fifth weighting coefficient, and a sixth value generated by multiplying the sixth difference by the sixth weighting coefficient, and determine whether the misrecognition has occurred in a parameter group that includes at least the first traveling parameter, the second traveling parameter, the third traveling parameter, and the fourth traveling parameter using the first value, the second value, the third value, the fourth value, the fifth value, and the sixth value.

In addition, in the above aspect of an exemplary embodiment, the determiner may determine whether a sum of the first value, the second value, the third value, the fourth value, the fifth value, and the sixth value is less than a predetermined threshold, and, in response to determining that the sum of the first value, the second value, the third value, the fourth value, the fifth value, and the sixth value is less than the predetermined threshold, determine that the misrecognition has occurred in the parameter group that includes at least the first traveling parameter, the second traveling parameter, the third traveling parameter, and the fourth traveling parameter.

According to an aspect of an exemplary embodiment, a misrecognition determination device may include one or more processors configured to: calculate at least a first traveling parameter that is used for driving control of a vehicle and is based on a first input data, a second traveling parameter that is used for driving control of the vehicle and is based on a second input data, and a third traveling parameter that is used for driving control of the vehicle and is based on a third input data; calculate at least a first difference that is a difference between the first traveling parameter and the second traveling parameter, a second difference that is a difference between the first traveling parameter and the third traveling parameter, and a third difference that is a difference between the second traveling parameter and the third traveling parameter; calculate at least a first weighting coefficient, a second weighting coefficient, and a third weighting coefficient, the first weighting coefficient corresponding to an orthogonality between the first input data and the second input data in a traveling situation of the vehicle, the second weighting coefficient corresponding to an orthogonality between the first input data and the third input data in the traveling situation of the vehicle, and the third weighting coefficient corresponding to an orthogonality between the second input data and the third input data in the traveling situation of the vehicle, such that a higher weighting coefficient corresponds to a higher orthogonality; calculate a first value generated by multiplying the first difference by the first weighting coefficient, a second value generated by multiplying the second difference by the second weighting coefficient, and a third value generated by multiplying the third difference by the third weighting coefficient; determine whether a misrecognition has occurred in a parameter group that includes at least the first traveling parameter, the second traveling parameter, and the third traveling parameter using the first value, the second value, and the third value; and output a result of the determining.

The one or more processors may be further configured to reset at least one of the first weighting coefficient, the second weighting coefficient, and the third weighting coefficient in response to a manual driving switching operation being performed during driving control of the vehicle. The one or more processors may be further configured to: determine whether a sum of the first value, the second value, and the third value is less than a predetermined threshold; and in response to determining that the sum of the first value, the second value, and the third value is less than the predetermined threshold, determine that the misrecognition has occurred in the parameter group that includes at least the first traveling parameter, the second traveling parameter, and the third traveling parameter.

The one or more processors may be further configured to: calculate a fourth traveling parameter, used for driving control of the vehicle, based on a fourth input data; calculate at least the first difference, the second difference, the third difference, a fourth difference that is a difference between the first traveling parameter and the fourth traveling parameter, a fifth difference that is a difference between the second traveling parameter and the fourth traveling parameter, and a sixth difference that is a difference between the third traveling parameter and the fourth traveling parameter; calculate at least the first weighting coefficient, the second weighting coefficient, the third weighting coefficient, a fourth weighting coefficient corresponding to an orthogonality between the first input data and the fourth input data in the traveling situation of the vehicle, a fifth weighting coefficient corresponding to an orthogonality between the second input data and the fourth input data in the traveling situation of the vehicle, and a sixth weighting coefficient corresponding to an orthogonality between the third input data and the fourth input data in the traveling situation of the vehicle; calculate a fourth value generated by multiplying the fourth difference by the fourth weighting coefficient, a fifth value generated by multiplying the fifth difference by the fifth weighting coefficient, and a sixth value generated by multiplying the sixth difference by the sixth weighting coefficient; and determine whether the misrecognition has occurred in a parameter group that includes at least the first traveling parameter, the second traveling parameter, the third traveling parameter, and the fourth traveling parameter using the first value, the second value, the third value, the fourth value, the fifth value, and the sixth value.

The one or more processors may be further configured to: determine whether a sum of the first value, the second value, the third value, the fourth value, the fifth value, and the sixth value is less than a predetermined threshold; and in response to determining that the sum of the first value, the second value, the third value, the fourth value, the fifth value, and the sixth value is less than the predetermined threshold, determine that the misrecognition has occurred in the parameter group that includes at least the first traveling parameter, the second traveling parameter, the third traveling parameter, and the fourth traveling parameter.

According to an aspect of an exemplary embodiment, a method of identifying a misrecognition event of one or more sensors of a vehicle includes: receiving a first input data from a first input sensor, a second input data from a second input sensor, and a third input data from a third input sensor; calculating a first traveling parameter using the first input data, a second traveling parameter using the second input data, and a third traveling parameter using the third input data, wherein the first, second, and third traveling parameters are used for driving control of the vehicle; calculating a first difference corresponding to a difference between the first traveling parameter and the second traveling parameter, a second difference corresponding to a difference between the first traveling parameter and the third traveling parameter, and a third difference corresponding to a difference between the second traveling parameter and the third traveling parameter; calculating a first weighting coefficient corresponding to an orthogonality between the first input data and the second input data in a traveling situation of the vehicle, a second weighting coefficient corresponding to an orthogonality between the first input data and the third input data in the traveling situation of the vehicle, and a third weighting coefficient corresponding to an orthogonality between the second input data and the third input data in the traveling situation of the vehicle; calculating a first value corresponding to a product of the first difference and the first weighting coefficient, a second value corresponding to a product of the second difference and the second weighting coefficient, and a third value corresponding to a product of the third difference and the third weighting coefficient; and identifying a misrecognition event of one or more of the first input sensor, the second input sensor, and the third input sensor based on a sum of the first value, the second value, and the third value.

The step of identifying the misrecognition event may include: determining whether the sum of the first value, the second value, and the third value is less than a predetermined threshold; and, in response to determining that the sum of the first value, the second value, and the third value is less than the predetermined threshold, determining that the misrecognition event has occurred. The method may further include the step of outputting a signal indicating that the misrecognition event has occurred. The traveling situation of the vehicle may be one of: approaching a branch in a roadway, approaching a tunnel exit, traveling in a city area, or traveling behind another vehicle wherein the other vehicle is adjacent to a third vehicle larger than the other vehicle. The receiving the first input data from the first input sensor may include receiving the first input data from one of a camera, a radar, or a Laser Imaging Detection and Ranging (LIDAR) device.

According to an aspect of an exemplary embodiment, it is possible to accurately determine whether misrecognition occurs in a parameter group that includes a plurality of traveling parameters calculated based on input data.

BRIEF DESCRIPTION OF THE DRAWINGS

Features, advantages, and technical and industrial significance of the exemplary embodiments will be described below with reference to the accompanying drawings, in which like numerals denote like elements, and wherein.

DETAILED DESCRIPTION OF EMBODIMENTS

Figure 1:
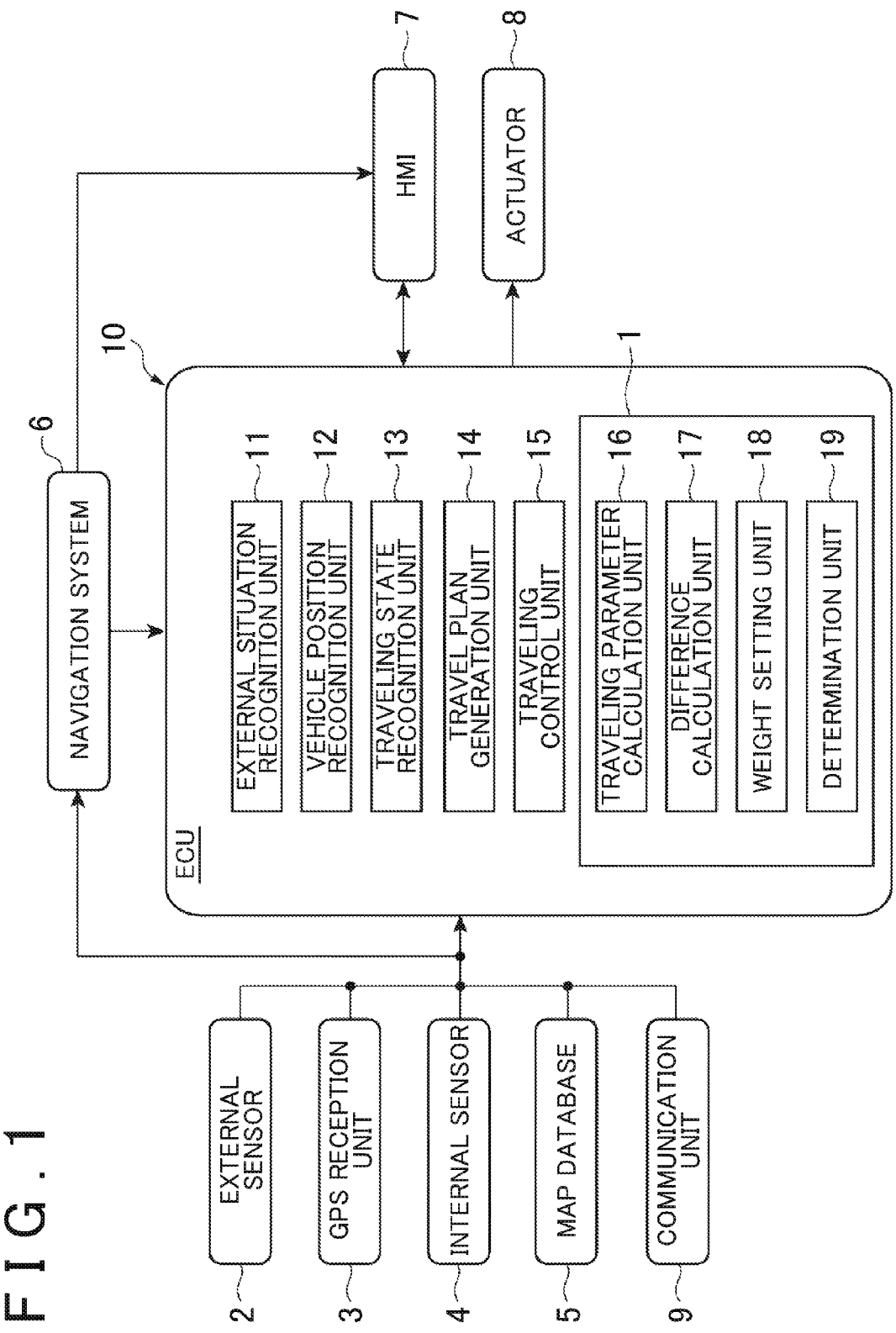
FIG. 1 is a block diagram showing a configuration of a misrecognition determination device according to an aspect of an exemplary embodiment.

Aspects of exemplary embodiments are described below with reference to the drawings. In the description below, the same reference numeral is used for the same or equivalent component and the redundant description is not repeated.

FIG. 1 is a diagram showing the outline of a configuration of a misrecognition determination device 1 according to an aspect of an exemplary embodiment.

As shown in FIG. 1, the misrecognition determination device 1 is mountable on a vehicle, and may be used for determining whether the traveling parameters used for the driving control of the vehicle are misrecognized. The traveling parameters are parameters about traveling calculated based on the input data obtained from the detection data of the sensors mounted on the vehicle. For example, the traveling parameters are parameters indicating the traveling environment or the traveling state of the vehicle. More specifically, the traveling parameters are the curvature of a traveling road (lane), curvature change rate, yaw angle of a vehicle, offset, yaw rate, lane width, number of lanes, distance and speed relative to the surrounding vehicles, and so on. For example, the input data is the detection data on the lane markings of a lane, position data or motion trajectory data on a preceding vehicle, position data on a host vehicle, and map data.

This misrecognition determination device 1 may be mounted, for example, on a vehicle that can perform autonomous driving control. That is, the misrecognition determination device 1 may be mounted on a vehicle that travels autonomously along a traveling road without input from a vehicle occupant. In the description below, autonomous driving refers to a technology that allows a vehicle to travel autonomously along a traveling road. For example, autonomous driving includes a technology that allows a vehicle to travel autonomously toward a pre-set destination without the need for the vehicle driver to perform the driving operation. Autonomous driving control does not necessarily mean that the driving control of a vehicle is all performed autonomously. Autonomous driving includes traveling that is done autonomously with the driver not expected to be primarily responsible for the driving operation. More specifically, steering control under lane trace control is included in autonomous driving control.

In addition, the misrecognition determination device 1 can be applied not only to an autonomous driving control device, but also to a vehicle on which driving assist control is performed. However, in the following exemplary embodiment, the misrecognition determination device 1 is described as being mounted on a vehicle that can perform autonomous driving control.

The misrecognition determination device 1 is configured as an Electronic Control Unit (ECU) 10. The ECU 10, an electronic control unit that performs misrecognition determination control for the traveling parameters, is configured with a computer as its main component, wherein the computer includes a Central Processing Unit (CPU), a Read Only Memory (ROM), and a Random Access Memory (RAM). This ECU 10 functions also as an electronic control unit for performing the driving control of the vehicle. The detail of the ECU 10 will be described later in detail.

An external sensor 2, a Global Positioning System (GPS) reception unit 3, an internal sensor 4, a map database 5, a navigation system 6, a Human Machine Interface (HMI) 7, an actuator 8, and a communication unit 9 are connected to the ECU 10.

The external sensor 2 is a detection apparatus for detecting the external situation that is the surrounding information on the vehicle. The external sensor 2 includes at least one of a camera, radar, and a Laser Imaging Detection and Ranging (LIDAR). The external sensor 2, which includes a camera, radar, and LIDAR, functions as an input data acquisition unit for acquiring the input data on the traveling environment or the traveling state of the vehicle. The traveling parameters of the vehicle are calculated based on this input data.

The camera of the external sensor 2 is a capturing apparatus that captures the external situation of the vehicle. This camera functions as a detection unit for detecting the lane markings provided on the right and left of the lane in which the vehicle is traveling, and sends the image data, generated by capturing the lane markings, to the ECU 10. Lane markings are the marking lines of a lane provided on the road surface of the lane, one for each of the right and the left. Each lane marking may be a white line, a yellow line, or a line of other colors. In addition, the lane marking may be a solid line or a broken line and may be a single line or a composite line. The lane markings of a lane are recognized based on the image data received from the camera and, based on the recognized lane markings, the vehicle lateral position in relation to the lane, or the offset, can be recognized as a traveling parameter. In addition, by recognizing the lane markings of the lane, the yaw angle of the vehicle and the curvature and the curvature change rate of the lane can be recognized as traveling parameters.

The camera is provided, for example, on the interior side of the windshield of the vehicle. The camera may be a monocular camera or a stereo camera. The stereo camera includes two capturing units arranged so that the disparity between the right eye and the left eye can be reproduced. The information captured by the stereo camera also includes the depth direction information. The camera may be used as an object detection unit that detects surrounding objects and surrounding vehicles including a preceding vehicle and an obstacle.

The radar detects an obstacle outside the vehicle or other vehicles around the vehicle, including the preceding vehicle, using a radio wave (for example, millimeter wave). The radar detects an obstacle by sending a radio wave to the surroundings of the vehicle and by receiving the radio wave reflected by an obstacle or other vehicles. The radar sends the detected obstacle information to the ECU 10. Based on the detection information received from the radar, the position data or the motion trajectory data on the preceding vehicle is recognized as the input data. When sensor fusion is performed using the radar and the camera, it is desirable that the reception information on the radio wave be sent to the ECU 10. In this case, the motion trajectory of the preceding vehicle can be recognized using the detection information received from the radar and the image information received from the camera.

The LIDAR detects an obstacle outside the vehicle, or other vehicles around the vehicle including the preceding vehicle, using light. The LIDAR measures the distance to a reflection point and detects an obstacle by sending light to the surroundings of the vehicle and by receiving light reflected by an obstacle. The LIDAR sends the detected obstacle information to the ECU 10. Based on the detection information received from the LIDAR, the position data or the motion trajectory data on the preceding vehicle is recognized as the input data. When sensor fusion is performed using the LIDAR and the camera, it is desirable that the reception information on a reflected light be sent to the ECU 10. In this case, the motion trajectory of the preceding vehicle can be recognized using the detection information received from the radar and the image information received from the camera. Two or more of the camera, LIDAR, and radar need not necessarily be installed.

The GPS reception unit 3 receives signals from three or more GPS satellites to measure the vehicle position (for example, the longitude and latitude of the vehicle). The GPS reception unit 3 sends the measured position information on the vehicle to the ECU 10. It should be noted that, instead of the GPS reception unit 3, another unit that can identify the longitude and latitude of the vehicle may be used. The function to measure the direction of the vehicle, if available, is desirable for use in comparison between the measured result of the sensor and the map information that will be described later.

The internal sensor 4 is a detection apparatus that detects the traveling state of the vehicle that is the host vehicle. The internal sensor 4 includes at least one of a vehicle speed sensor, an acceleration sensor, and a yaw rate sensor. The vehicle speed sensor is a detection apparatus that detects the speed of the vehicle. For example, as the vehicle speed sensor, a wheel speed sensor is used. The wheel speed sensor is provided on the wheels of the vehicle or on a component such as the drive shaft, which rotates in synchronization with the wheels, to detect the rotation speed of the wheels. The vehicle speed sensor sends the detected vehicle speed information (wheel speed information) to the ECU 10.

The acceleration sensor is a detection apparatus that detects the acceleration of the vehicle. For example, the acceleration sensor includes a longitudinal acceleration sensor that detects acceleration in the longitudinal direction of the vehicle and a lateral acceleration sensor that detects the lateral acceleration of the vehicle. For example, the acceleration sensor sends the acceleration information on the vehicle to the ECU 10. The yaw rate sensor is a detection apparatus that detects the yaw rate (turning angle velocity) around the vertical axis at the center of gravity of the vehicle. For example, a gyro sensor may be used as the yaw rate sensor. The yaw rate sensor sends the detected yaw rate information on the vehicle to the ECU 10 as the input data.

The yaw rate sensor functions as an information acquisition unit for detecting the yaw angle, one of the traveling parameters of the vehicle.

A steering angle sensor and a steering torque sensor may also be provided as the internal sensor 4. The steering angle sensor is a detection apparatus that detects the steering angle of the steering wheel of the vehicle. This steering angle sensor sends the detected steering angle information to the ECU 10 as the input data. The steering angle sensor functions as an information acquisition unit for detecting the yaw angle, one of the traveling parameters of the vehicle. The steering torque sensor is a detection apparatus that detects the steering torque of the steering wheel of the vehicle. This steering torque sensor sends the detected steering torque information to the ECU 10 as the input data. The steering torque sensor functions as an information acquisition unit for detecting the yaw angle, one of the traveling parameters of the vehicle.

The map database 5 is a database that stores map information. For example, the map database is formed in a hard disk drive (HDD) mounted on the vehicle. The map information includes the position information on roads, the road shape information (for example, curvature, curvature change rate, lane width, number of lanes, etc.), and the position information on intersections and junctions. In addition, to use the position information on shielding structures, such as a building or a wall, and the Simultaneous Localization and Mapping (SLAM) technology, it is desirable for the map information to include the output signal of the external sensor 2. The map database may also be stored in a computer facility, such as an information processing center, that can communicate with the vehicle.

The navigation system 6 is a device that guides the driver of the vehicle to the destination that is set by the driver of the vehicle. The navigation system 6 calculates a route, along which the vehicle will travel, based on the position information on the vehicle measured by the GPS reception unit 3 and the map information stored in the map database 5. The route may be a suitably identified lane in a multiple-lane area. The navigation system 6 calculates a target route from the vehicle position to the destination and informs the driver about the target route through display on the display device or through voice output from the speaker. The navigation system 6 sends the information on the target route of the vehicle to the ECU 10. The navigation system 6 may also be stored in a computer facility, such as an information processing center, that can communicate with the vehicle.

This navigation system 6 can send the vehicle position data and the map data on the traveling road at that vehicle position to the ECU 10 as the input data. This navigation system 6 functions as an information acquisition unit that acquires information such as the curvature of a lane, curvature change rate, and so on.

The communication unit 9 is a communication apparatus that communicates with an apparatus external to the vehicle. For example, as the communication unit 9, a vehicle-vehicle communication apparatus that communicates with other vehicles, a road-vehicle communication apparatus that performs infrastructure communication, or a communication apparatus that communicates with a person (for example, communication with a terminal apparatus carried by a person) is used. This communication unit 9 can acquire the position information or the vehicle speed information on other vehicles and the position information or the movement information on pedestrians, and sends the acquired information to the ECU 10 as the input data. This communication unit 9 functions as an information acquisition unit that acquires the curvature and the curvature change rate of a lane that are the traveling parameters of the vehicle. In addition, the communication unit 9 may send the traveling parameters, calculated by the ECU 10, to a unit external to the vehicle for use as the traveling parameter information for cloud computing.

The HMI 7 is an interface for outputting and inputting information between the occupants (including the driver) of the vehicle and the misrecognition determination device 1. The HMI 7 has a display panel for displaying image information to the occupants, a speaker for outputting voices, and operation buttons or a touch panel for allowing the occupants to perform input operations. When an occupant performs an input operation to start or stop autonomous driving control, the HMI 7 outputs the signal to the ECU 10 to start or stop autonomous driving control. When the vehicle reaches the destination where autonomous driving control is to be terminated, the HMI 7 informs the occupants that the vehicle will reach the destination. The HMI 7 may output information to the occupants using a wirelessly connected mobile information terminal or may receive an input operation from an occupant using a mobile information terminal.

The actuator 8 is a device that performs the autonomous driving control of the vehicle. The actuator 8 includes at least a throttle actuator, a brake actuator, and a steering actuator. The throttle actuator controls the amount of air to be supplied to the engine (throttle angle) according to the control signal from the ECU 10 to control the driving force of the vehicle. When the vehicle is a hybrid vehicle or an electric vehicle, the actuator 8 does not include a throttle actuator and, in this case, the control signal is sent from the ECU 10 to the motor, which is the source of power, to control the driving force.

The brake actuator controls the brake system according to the control signal, received from the ECU 10, to control the controlling force to be applied to the wheels of the vehicle. As the brake system, a hydraulic brake system may be used. The steering actuator controls the driving of the assist motor, one component of the electric power steering system for controlling the steering torque, according to the control signal received from the ECU 10. By doing so, the steering actuator controls the steering torque of the vehicle.

The external sensor 2, GPS reception unit 3, internal sensor 4, map database 5, navigation system 6, and communication unit 9 described above are the apparatuses each of which functions as an information acquisition unit that acquires information for calculating the input data and the traveling parameters used for the driving control of the vehicle. However, depending upon the contents of driving control, one or more of the external sensor 2, GPS reception unit 3, internal sensor 4, map database 5, navigation system 6, and communication unit 9 are not installed.

The ECU 10 includes an external situation recognition unit 11, a vehicle position recognition unit 12, a traveling state recognition unit 13, a travel plan generation unit 14, a traveling control unit 15, and the misrecognition determination device 1.

The external situation recognition unit 11 recognizes the external situation of the vehicle based on the detection result of the external sensor 2 (for example, information captured by the camera, obstacle information detected by the radar, and obstacle information detected by LIDAR) or the map data information. The external situation includes the lane width of the road, the road shape (for example, the curvature and the curvature change rate of the lane, a change in the slope of the road surface and undulations efficiently used for the prospect estimation by the external sensor 2, and the crossing, branching, and merging of roads, etc.), the situation of other vehicles around the vehicle (for example, position of a preceding vehicle, the vehicle speed of a preceding vehicle, and the motion trajectory of a preceding vehicle, etc.), and the situation of obstacles around the vehicle (for example, information for distinguishing between non-moving obstacles and moving obstacles, the position of an obstacle around the vehicle, moving direction of an obstacle around the vehicle, and relative speed of an obstacle around the vehicle). It possible to compare the detection result of the external sensor 2 and the map information to increase accuracy in the position and direction of the vehicle acquired by the GPS reception unit 3.

The external situation recognition unit 11 may function as a traveling parameter calculation unit for calculating the traveling parameters. For example, the external situation recognition unit 11 calculates the curvature of a lane and the curvature change rate that are traveling parameters. More specifically, the external situation recognition unit 11 receives the image information from the camera, recognizes the lane markings from the image information and, based on the shape of the lane markings, calculates the curvature and the curvature change rate of the lane or the traveling road ahead of the vehicle. In this case, the recognition data or the detection data on the lane markings are the input data. In addition, the external situation recognition unit 11 recognizes the motion trajectory of the preceding vehicle based on the image information received from the camera and the detection information received from the radar or LIDAR and, based on the motion trajectory of the preceding vehicle, calculates the curvature and the curvature change rate of the lane or the traveling road ahead of the vehicle. In this case, the motion trajectory data on the preceding vehicle is the input data. In addition, the external situation recognition unit 11 calculates the curvature and the curvature change rate of the lane or the traveling road ahead of the vehicle based on the map data received from the navigation system 6. In this case, the current vehicle position data and the map data are the input data.

The external situation recognition unit 11 functions as a traveling scene recognition unit that recognizes the traveling scene of the vehicle. For example, the external situation recognition unit 11 recognizes any of the following traveling scenes as the traveling scene of the vehicle: the traveling scene in which it is difficult to detect the lane markings because there is a preceding vehicle at a branch point, the traveling scene around the exit of a tunnel, the traveling scene in which a large-sized car is traveling to the side of a preceding vehicle, and the traveling scene of a city area surrounded by buildings larger than a predetermined size. The traveling scene refers to the traveling situation of the vehicle that is recognized as the traveling environment situation or the traveling environment state of the vehicle. The recognition method of a traveling scene is to identify and recognize the traveling scene based on the situation of the other surrounding vehicles obtained through radar detection as well as on the map information. In particular, it is also possible to pre-set traveling scenes in which the traveling parameters of the same type are misrecognized at the same time and to determine whether the current traveling scene corresponds to one of the preset traveling scenes. Data on traveling scenes may also be pre-recorded with that data associated with the map data.

The vehicle position recognition unit 12 recognizes the position of the vehicle (hereinafter called "vehicle position") on the map based on the position information on the vehicle received by the GPS reception unit 3 and the map information stored in the map database 5. The vehicle position recognition unit 12 may also recognize the vehicle position by acquiring the vehicle position, which is used by the navigation system 6, from the navigation system 6. When the vehicle position can be measured by a sensor installed outside the vehicle, for example, on the road, the vehicle position recognition unit 12 may acquire the vehicle position from this sensor via communication. In addition, the vehicle position recognition unit 12 recognizes the vehicle position in the lane based on the information captured by the camera of the external sensor 2.

The vehicle position recognition unit 12 may function as a traveling parameter calculation unit for calculating the traveling parameters. For example, the vehicle position recognition unit 12 calculates the lateral position in relation to the lane, or the offset, that is a traveling parameter. More specifically, the vehicle position recognition unit 12 recognizes the lane markings from the image information received from the camera and, based on the lane markings, calculates the offset of the vehicle. In addition, the vehicle position recognition unit 12 may calculate the offset of the vehicle based on the map data and on the vehicle position information received by the GPS reception unit 3.

The traveling state recognition unit 13 recognizes the traveling state of the vehicle, which is the host vehicle, based on the detection result of the internal sensor 4 (vehicle speed information detected by the vehicle speed sensor, acceleration information detected by the acceleration sensor, yaw rate information detected by the yaw rate sensor, steering angle information detected by the steering angle sensor, steering torque information detected by the steering torque sensor, etc.). For example, the traveling state of the vehicle includes the vehicle speed, acceleration, yaw rate, and yaw angle.

This traveling state recognition unit 13 may function as a traveling parameter calculation unit for calculating traveling parameters. For example, the traveling state recognition unit 13 calculates the yaw angle of the vehicle that is one of the traveling parameters. More specifically, the traveling state recognition unit 13 recognizes the lane markings and so on from the image information received from the camera and, based on the lane markings and so on, calculates the yaw angle of the vehicle. In addition, the traveling state recognition unit 13 may calculate the yaw angle of the vehicle based on the map data and on a temporal change in the vehicle position information received by the GPS reception unit 3. The traveling state recognition unit 13 may also calculate the yaw angle of the vehicle based on the yaw rate information detected by the yaw rate sensor. The traveling state recognition unit 13 may also calculate the yaw angle of the vehicle based on the information detected by the steering angle sensor or the steering torque sensor.

The travel plan generation unit 14 generates a target travel path of the vehicle based on the target route calculated by the navigation system 6, the vehicle position recognized by the vehicle position recognition unit 12, and the external situation of the vehicle (including the vehicle position and direction) recognized by the external situation recognition unit 11. The target travel path is a trajectory along which the vehicle will travel on the target route. The travel plan generation unit 14 generates a path so that the vehicle travels smoothly on the target route from the viewpoint of safety, regulation compliance, and traveling efficiency. In this case, the travel plan generation unit 14 generates a path of the vehicle in such a manner that the vehicle will avoid contact with an obstacle based on the situation of the obstacles around the vehicle.

The target route mentioned here includes a traveling route generated automatically based on the external situation and the map information when the destination is not explicitly specified by the driver. An example of such a traveling route is a road-following route in the "driving assistance device" described in Japanese Patent No. 5382218 (WO2011/158347) or in the "autonomous driving device" described in Japanese Patent Application Publication No. 2011-162132 (JP 2011-162132 A).

The travel plan generation unit 14 generates a travel plan according to a generated path. That is, the travel plan generation unit 14 generates a travel plan along the pre-set target route, based at least on the external situation that is the surrounding information on the vehicle as well as on the map information stored in the map database 5. Preferably, the travel plan generation unit 14 outputs a generated travel plan in a form in which the course of the vehicle is represented by a plurality of sets, or configuration coordinates (p, v), each composed of two elements, the target position p in the vehicle-fixed coordinate system and the speed v at each target point. Each target position p at least has the information on the positions of the x-coordinate and y-coordinate in the vehicle-fixed coordinate system or the information equivalent to that information. A travel plan is not limited to a specific form as long as the plan indicates the behavior of the vehicle. For example, in a travel plan, the target time t may be used in place of the speed v, or the target time t and the direction of the vehicle at that time may be added.

Normally, a travel plan is represented sufficiently by data indicating the future that is approximately several seconds from the current time. However, because several tens of seconds of data is required depending upon a situation, for example, when the vehicle will turn right at an intersection or the vehicle will pass another vehicle, it is desirable that the number of configuration coordinates of a travel plan be variable and that the distance between configuration coordinates be variable. In addition, the curve joining the configuration coordinates may be approximated by a spline function and the parameters of that curve may be used as a travel plan. To generate a travel plan, any known method that can describe the behavior of the vehicle may be used.

A travel plan may be represented by data indicating a change in the vehicle speed, acceleration/deceleration, and steering torque of the vehicle that will be applied when the vehicle travels in a course along the target route. A travel plan may include a speed pattern, an acceleration/declaration pattern, and a steering pattern of the vehicle. The travel plan generation unit 14 described above may generate a travel plan so that the travel time (time required for the vehicle to reach the destination) is minimized.

Incidentally, the speed pattern refers to data composed of target vehicle speeds each of which is set associated with the time at each of the target control positions that are set on the course at a predetermined interval (for example, 1 m). The acceleration/deceleration pattern refers to data composed of target acceleration/deceleration values each of which is set associated with the time at each of the target control positions that are set on the course at a predetermined interval (for example, 1 m). The steering pattern refers to data composed of target steering torques each of which is set associated with the time at each of the target control positions that are set on the course at a predetermined interval (for example, 1 m).

An example of travel plan generation is described below more specifically. The travel plan generation unit 14 calculates the target steering angle based on the lane curvature, curvature change rate, lateral position of the vehicle, and yaw angle all of which are traveling parameters. For the lane curvature and the curvature change rate, the information recognized by the external situation recognition unit 11 may be used. For the lateral position of the vehicle, the information recognized by the vehicle position recognition unit 12 may be used. For the yaw angle of the vehicle, the information recognized by the traveling state recognition unit 13 may be used. After this calculation, the travel plan generation unit 14 calculates the target steering torque to implement the target steering angle of the vehicle. The calculated target steering torque is output from the travel plan generation unit 14 to the traveling control unit 15.

The traveling control unit 15 autonomously controls the traveling of the vehicle based on the travel plan generated by the travel plan generation unit 14. The traveling control unit 15 outputs the control signal, generated according to the travel plan, to the actuator 8. By doing so, the traveling control unit 15 controls the traveling of the vehicle so that the vehicle autonomously travels along the travel plan.

The misrecognition determination device 1 includes a traveling parameter calculation unit 16, for instance, a traveling parameter calculator, a difference calculation unit 17, for instance, a difference calculator, a weight setting unit 18, for instance, a weight setter, and a determination unit 19, for instance, a determiner.

The traveling parameter calculation unit 16 calculates traveling parameters based on the input data for calculating at least three traveling parameters of the same type. For example, with the recognition data on the lane markings, acquired from the image information from the camera, as first input data, the traveling parameter calculation unit 16 calculates the curvature of the traveling road as a first traveling parameter based on the first input data. Similarly, with the recognition data on the motion trajectory of the preceding vehicle, acquired from the image information from the camera, as second input data, the traveling parameter calculation unit 16 calculates the curvature of the traveling road as a second traveling parameter based on the second input data. Similarly, with the vehicle position information and the map data in the navigation system 6 as third input data, the traveling parameter calculation unit 16 calculates the curvature of the traveling road as a third traveling parameter based on the third input data. In this manner, the traveling parameter calculation unit 16 calculates the same type of traveling parameters multiple times based on the first input data, second input data, and third input data that are different from each other.

The traveling parameter calculation unit 16 may calculate three or more traveling parameters of the same type based on three or more pieces of input data. For example, in addition to the first traveling parameter, second traveling parameter, and third traveling parameter, the traveling parameter calculation unit 16 may calculate a fourth traveling parameter based on fourth input data. In addition, the traveling parameter calculation unit 16 may calculate a traveling parameter other than the curvature, such as the curvature change rate, yaw angle of the vehicle, or offset. If the external situation recognition unit 11, vehicle position recognition unit 12, and traveling state recognition unit 13 described above are configured to function as a traveling parameter calculation unit, the traveling parameter calculation unit 16 may not be installed.

The difference calculation unit 17 calculates the difference value between each two of the traveling parameters that are calculated by the traveling parameter calculation unit 16 and that are different from each other. For example, the difference calculation unit 17 calculates at least a first difference that is the difference between the first traveling parameter and the second traveling parameter that are calculated by the traveling parameter calculation unit 16, a second difference that is the difference between the first traveling parameter and the third traveling parameter, and a third difference that is the difference between the second traveling parameter and the third traveling parameter. The difference between the traveling parameters is calculated, for example, by subtracting one of the traveling parameters from the other traveling parameter and by calculating the absolute value of the resulting value. In addition, for four or more traveling parameters, the difference calculation unit 17 may calculate the difference between the traveling parameters that are different from each other. For example, when four traveling parameters, that is, the first traveling parameter, second traveling parameter, third traveling parameter, and fourth traveling parameter, are calculated, the difference calculation unit 17 calculates the first difference, second difference, third difference, a fourth difference that is the difference between the first traveling parameter and the fourth traveling parameter, a fifth difference that is the difference between the second traveling parameter and the fourth traveling parameter, and a sixth difference that is the difference between the third traveling parameter and the fourth traveling parameter.

The weight setting unit 18 sets a weighting coefficient according to the orthogonality between one piece of input data and another piece of input data in a particular traveling situation of the vehicle. For example, when there are three pieces of input data, that is, first input data, second input data, and third input data, at least the following three weighting coefficients are set: a first weighting coefficient according to the orthogonality between the first input data and the second input data in the traveling scene of the vehicle, a second weighting coefficient according to the orthogonality between the first input data and the third input data in the traveling scene, and a third weighting coefficient according to the orthogonality between the second input data and the third input data in the traveling situation. The first weighting coefficient is a weighting coefficient by which the difference between the first traveling parameter based on the first input data and the second traveling parameter based on the second input data is multiplied. The second weighting coefficient is a weighting coefficient by which the difference between the first traveling parameter based on the first input data and the third traveling parameter based on the third input data is multiplied. The third weighting coefficient is a weighting coefficient by which the difference between the second traveling parameter based on the second input data and the third traveling parameter based on the third input data is multiplied. As the traveling scene of the vehicle, a traveling scene recognized by the external situation recognition unit 11 described above may be used.

When there are four or more pieces of input data, the weight setting unit 18 sets a weighting coefficient according to the orthogonality between each two pieces of the input data that are different from each other. For example, when there are four pieces of input data, that is, when there are first input data, second input data, third input data, and fourth input data, at least the following six weighting coefficients are set: a first weighting coefficient according to the orthogonality between the first input data and the second input data in the traveling scene of the vehicle, a second weighting coefficient according to the orthogonality between the first input data and the third input data in the traveling scene, a third weighting coefficient according to the orthogonality between the second input data and the third input data in the traveling scene, a fourth weighting coefficient according to the orthogonality between the first input data and the fourth input data in the traveling scene, a fifth weighting coefficient according to the orthogonality between the second input data and the fourth input data in the traveling scene, and a sixth weighting coefficient according to the orthogonality between the third input data and the fourth input data in the traveling scene.

The weight setting unit 18 sets a weighting coefficient in such a way that the higher the orthogonality between two pieces of input data in a traveling scene of the vehicle is, the larger the weighting coefficient is. That is, when there are three pieces of input data, that is, first input data, second input data, and third input data, the weight setting unit 18 sets a larger first weighting coefficient as the orthogonality between the first input data and the second input data in the traveling situation of the vehicle is higher, a larger second weighting coefficient as the orthogonality between the first input data and the third input data in the traveling situation is higher, and a larger third weighting coefficient as the orthogonality between the second input data and the third input data in the traveling situation is higher. For example, when the orthogonality between the first input data and the second input data in the traveling scene of the vehicle is higher than the orthogonality between the first input data and the third input data, the first weighting coefficient is set larger than the second weighting coefficient.

In this description, the orthogonality between input data means a property that a plurality of pieces of input data is difficult to be misrecognized or misdetected at the same time. That is, high orthogonality means that the misrecognition or misdetection of a plurality of pieces of input data is less likely to occur at the same time. Therefore, setting a larger value for a weighting coefficient, by which the difference between the traveling parameters based on high-orthogonality input data is multiplied, can increase the value, generated by multiplying the difference by the weighting coefficient, thus making it possible to increase accuracy in the determination of the misrecognition of the traveling parameters based on that value.

The setting of a weighting coefficient is described below in detail. Because easily misrecognized input data and traveling parameters vary according to the traveling scene of the vehicle, the weighting coefficient is set according to the traveling scene.

Figure 2:
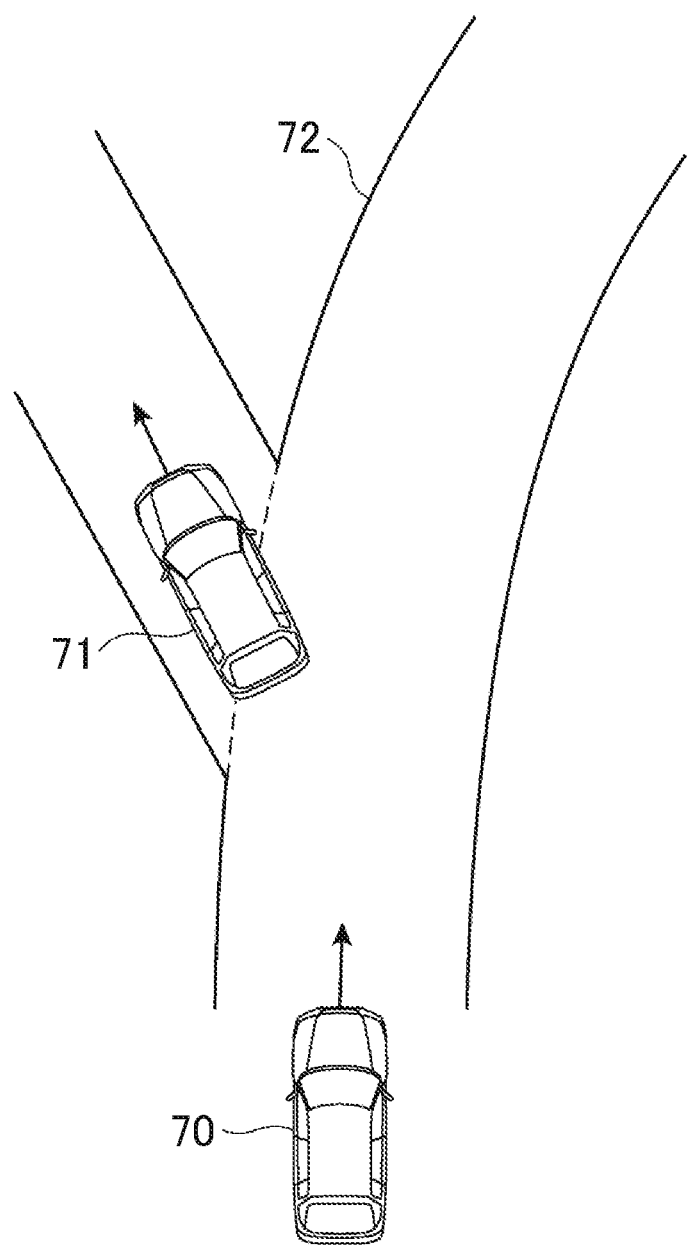
FIG. 2 is a diagram showing a traveling scene in which traveling parameters, used for driving control, are easily misrecognized.

For example, when the traveling scene of a host vehicle 70 is that the host vehicle 70 is traveling near a branch of the traveling road as shown in FIG. 2, a lane marking 72 in the straight ahead direction cannot be recognized due to the shadow of a preceding vehicle 71 and, in addition, the preceding vehicle 71 is leaving the lane with the result that the preceding-vehicle trajectory is recognized incorrectly. That is, the lane marking recognition data, indicated by the image information from the camera, and the preceding-vehicle trajectory data, indicated by the detection information from the radar, are misrecognized at the same time. On the other hand, the vehicle position data received from the GPS sensor is not misrecognized and, therefore, the curvature of the traveling road based on the map data, obtained by referring to the vehicle position data, can be recognized correctly. For this reason, in this traveling scene, the orthogonality between the lane marking recognition data and the preceding-vehicle trajectory data is lower than the orthogonality between the lane marking recognition data and the map data and the orthogonality between the preceding-vehicle trajectory data and the map data. In other words, in this traveling scene, the orthogonality between the lane marking recognition data and the map data and the orthogonality between the preceding-vehicle trajectory data and the map data are higher than the orthogonality between the lane marking recognition data and the preceding-vehicle trajectory data. Therefore, the weighting coefficient, by which the difference between the curvature based on the lane marking recognition data and the curvature based on the map data is multiplied, and the weighting coefficient, by which the difference between the curvature based on the preceding-vehicle trajectory data and the curvature based on the map data is multiplied, are set larger than the weighting coefficient by which the difference between the curvature based on the lane marking recognition data and the curvature based on the preceding-vehicle trajectory data is multiplied.

Figure 3:
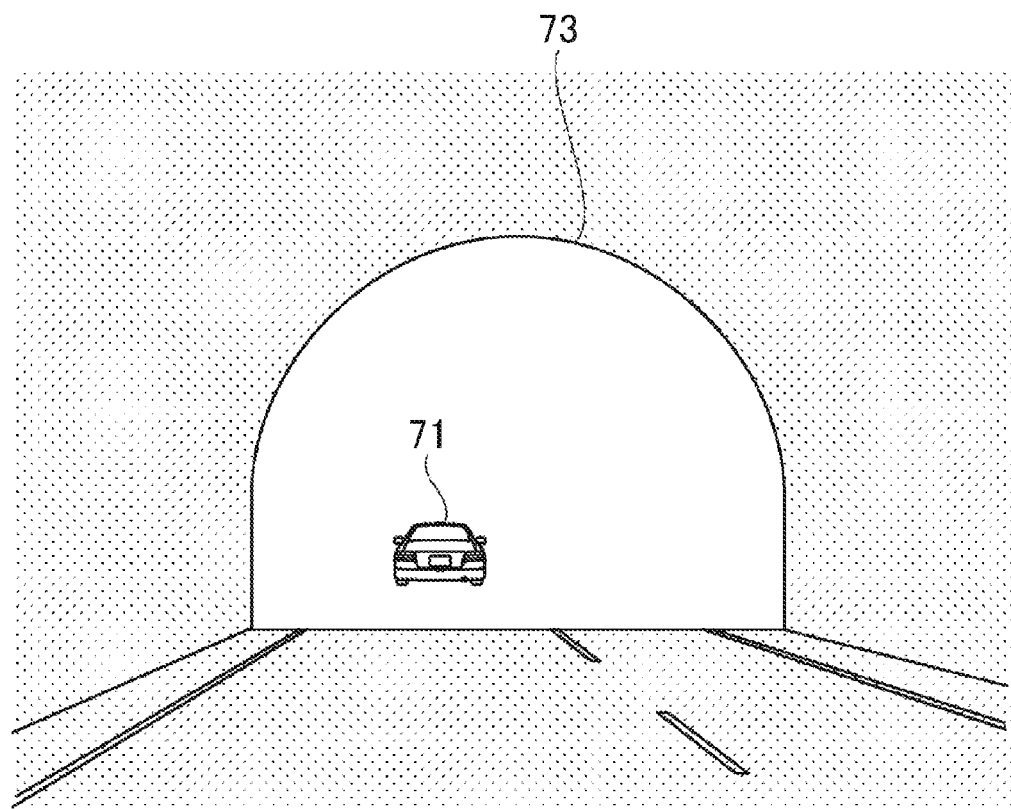
FIG. 3 is a diagram showing a traveling scene in which traveling parameters, used for driving control, are easily misrecognized.

When the traveling scene of the vehicle is that the vehicle is traveling near a tunnel exit 73 as shown in FIG. 3, it is difficult to detect the lane marking due to a backlight and, in addition, the GPS signal cannot be received with the result that the map data cannot be acquired correctly. That is, the lane marking recognition data, indicated by the image information from the camera, and the map data may be misrecognized at the same time. On the other hand, the preceding-vehicle trajectory data from the radar can be acquired correctly. For this reason, in this traveling scene, the orthogonality between the lane marking recognition data and the map data is lower than the orthogonality between the lane marking recognition data and the preceding-vehicle trajectory data and the orthogonality between the map data and the preceding-vehicle trajectory data. In other words, in this traveling scene, the orthogonality between the lane marking recognition data and the preceding-vehicle trajectory data and the orthogonality between the map data and the preceding-vehicle trajectory data are higher than the orthogonality between the lane marking recognition data and the map data. Therefore, the weighting coefficient, by which the difference between the curvature based on the lane marking recognition data and the curvature based on the preceding-vehicle trajectory data is multiplied, and the weighting coefficient, by which the difference between the curvature based on the map data and the curvature based on the preceding-vehicle trajectory data is multiplied, are set larger than the weighting coefficient by which the difference between the curvature based on the lane marking recognition data and the curvature based on the map data is multiplied.

Figure 4:
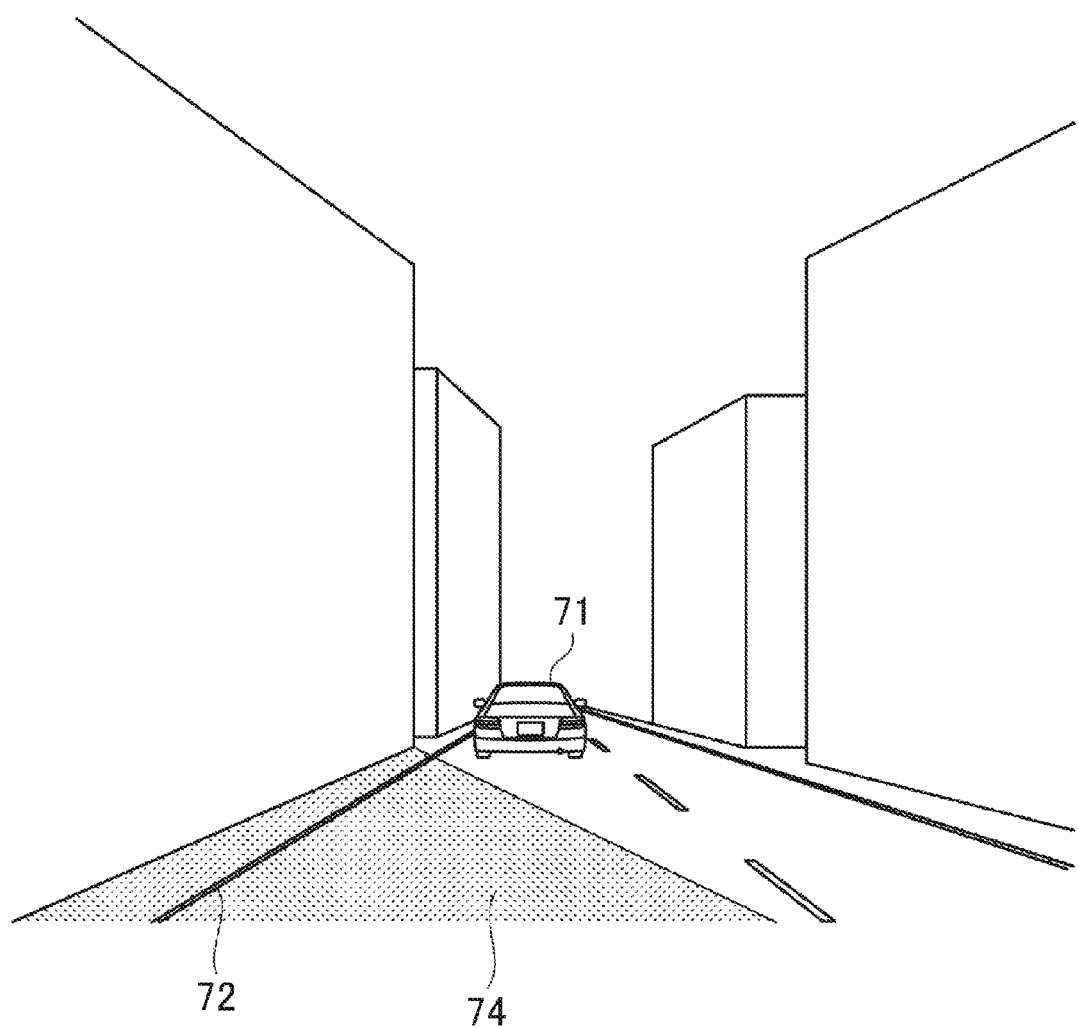
FIG. 4 is a diagram showing a traveling scene in which traveling parameters, used for driving control, are easily misrecognized.

When the traveling scene of the vehicle is that the vehicle is traveling in a city area as shown in FIG. 4, it becomes difficult to receive the GPS signal because the signal is blocked by the buildings and, in addition, it becomes difficult to detect the lane marking 72 due to a building shadow 74. That is, the lane marking recognition data, indicated by the image information from the camera, and the map data may be misrecognized at the same time. On the other hand, the preceding-vehicle trajectory data detected by the radar can be acquired correctly. For this reason, in this traveling scene, the orthogonality between the lane marking recognition data and the map data is lower than the orthogonality between the lane marking recognition data and the preceding-vehicle trajectory data and the orthogonality between the map data and the preceding-vehicle trajectory data. In other words, in this traveling scene, the orthogonality between the lane marking recognition data and the preceding-vehicle trajectory data and the orthogonality between the map data and the preceding-vehicle trajectory data are higher than the orthogonality between the lane marking recognition data and the map data. Therefore, the weighting coefficient, by which the difference between the curvature based on the lane marking recognition data and the curvature based on the preceding-vehicle trajectory data is multiplied, and the weighting coefficient, by which the difference between the curvature based on the map data and the curvature based on the preceding-vehicle trajectory data is multiplied, are set larger than the weighting coefficient by which the difference between the curvature based on the lane marking recognition data and the curvature based on the map data is multiplied.

Figure 5:
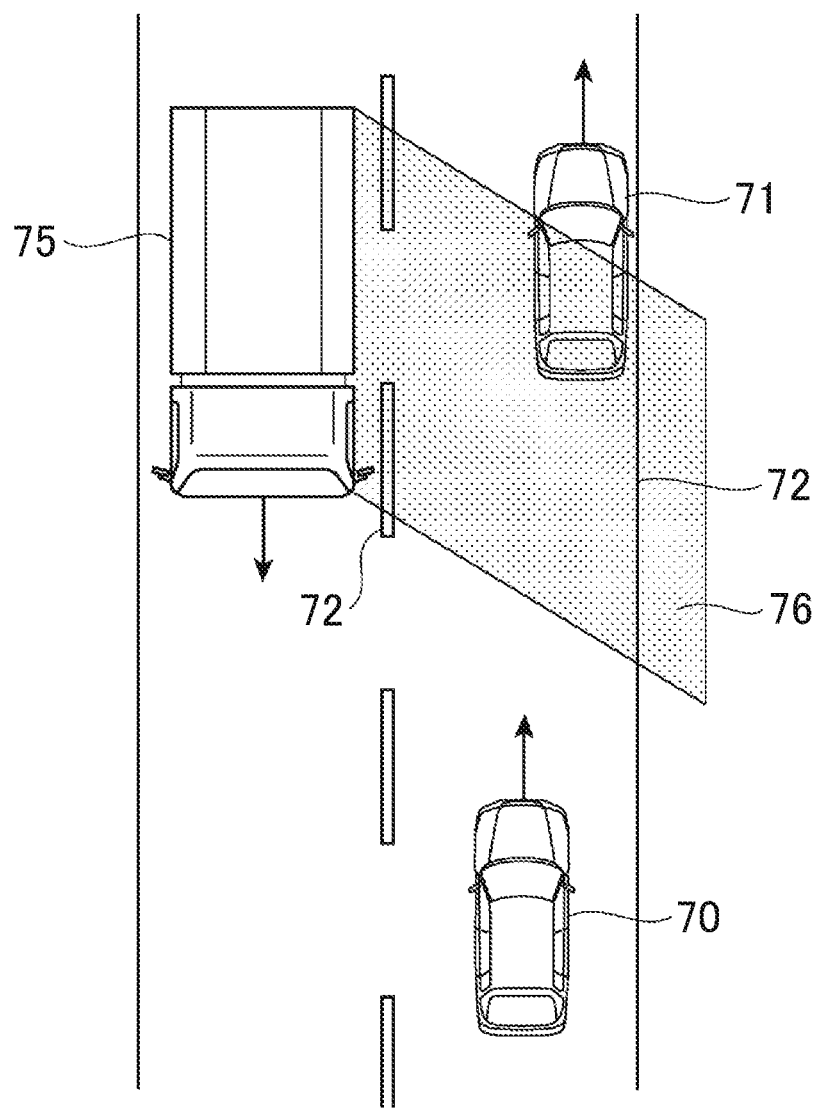
FIG. 5 is a diagram showing a traveling scene in which traveling parameters, used for driving control, are easily misrecognized.

When the traveling scene is that the vehicle is following the preceding vehicle 71 that is traveling to the side of a large-sized car 75 as shown in FIG. 5, it becomes difficult to detect the lane marking 72 due to a shadow 76 of the large-sized car 75 and, in addition, the preceding vehicle 71 is traveling near the edge of the lane with the result that the preceding-vehicle trajectory is incorrect. That is, the lane marking recognition data, indicated by the image information from the camera, and the preceding-vehicle trajectory data, indicated by the detection information from the radar, are misrecognized at the same time. On the other hand, the vehicle position data received from the GPS sensor is not misrecognized and, therefore, the map data, obtained by referring to the vehicle position data, can be recognized correctly. For this reason, in this traveling scene, the orthogonality between the lane marking recognition data and the preceding-vehicle trajectory data is lower than the orthogonality between the lane marking recognition data and the map data and the orthogonality between the preceding-vehicle trajectory data and the map data. In other words, in this traveling scene, the orthogonality between the lane marking recognition data and the map data and the orthogonality between the preceding-vehicle trajectory data and the map data are higher than the orthogonality between the lane marking recognition data and the preceding-vehicle trajectory data. Therefore, the weighting coefficient, by which the difference between the curvature based on the lane marking recognition data and the curvature based on the map data is multiplied, and the weighting coefficient, by which the difference between the curvature based on the preceding-vehicle trajectory data and the curvature based on the map data is multiplied, are set larger than the weighting coefficient by which the difference between the curvature based on the lane marking recognition data and the curvature based on the preceding-vehicle trajectory data is multiplied.

In any of the other traveling scenes where a plurality of pieces of input data is misrecognized at the same time, the weighting coefficient may be set in such a way that the higher the orthogonality between one piece of input data and another piece of input data corresponding to that traveling scene is, the larger may be set the weighting coefficient by which the difference between the traveling parameters based on those input data is multiplied. In the example described above, the curvature is used as an example of the traveling parameter. For other traveling parameters, too, the weighting coefficient may be set in such a way that the higher the orthogonality between one piece of input data and another piece of input data corresponding to that traveling scene is, the larger may be set the weighting coefficient by which the difference between the traveling parameters based on those input data is multiplied.

In FIG. 1, when the driver performs the manual driving switching operation during the driving control of the vehicle, the weight setting unit 18 resets the weighting coefficients used in the traveling situation corresponding to the time when the driver performs the manual driving switching operation so that the determination unit, which will be described later, more easily determines that misrecognition occurs than when the driver does not perform the manual driving switching operation. That is, the weight setting unit 18 has the function to adjust, update, or learn the weighting coefficients when autonomous driving is switched to manual driving. The manual driving switching operation performed by the driver is an operation performed during operation control such as a manual driving operation on the steering wheel or an operation on the manual driving switching button. The driver performs the manual operation driving switching operation during the operation control of the vehicle because the operation control is likely to be incorrect and, in this case, the weighting coefficients are adjusted. For example, when the first traveling parameter, second traveling parameter, and third traveling parameter are used during driving control, the first weighting coefficient, the second weighting coefficient, and the third weighting coefficient are used as the weighting coefficients by which the difference between the traveling parameters is multiplied. In this case, at least one of the first weighting coefficient, second weighting coefficient, and third weighting coefficient is adjusted.

More specifically, the adjustment is made in such a way that the weighting coefficient, by which the difference between two traveling parameters that are any two of the first traveling parameter, second traveling parameter, and third traveling parameter and that have a similar value is multiplied, is decreased. Instead of or in addition to that adjustment, the adjustment may be made in such a way that the weighting coefficients other than the weighting coefficient, by which the difference between the two traveling parameters having a similar value is multiplied, are increased. In addition, the adjustment may be made in such a way that the weighting coefficients, by which the difference corresponding to the traveling parameter having the most different value is multiplied, are increased. By making the adjustment as described above, the values each generated by multiplying the difference between traveling parameters by the weighting coefficient can be increased and, in determining the misrecognition of the traveling parameters using the magnitude of the values, misrecognition determination can be performed more accurately.

The determination unit 19 determines whether misrecognition is detected in the traveling parameters using the values each generated by multiplying the weighting coefficient by the difference between the traveling parameters. That is, the determination unit 19 determines whether misrecognition is detected in the parameter group including a plurality of traveling parameters, using the values each generated by multiplying the weighting coefficient by the difference between the traveling parameters. For example, when the first traveling parameter, second traveling parameter, and third traveling parameter are calculated as the traveling parameters of the same type, the determination unit 19 determines whether misrecognition is detected in the parameter group, which includes the first traveling parameter, second traveling parameter, and third traveling parameter, using the value generated by multiplying the first difference, which is the difference between the first traveling parameter and the second traveling parameter, by the first weighting coefficient, the value generated by multiplying the second difference, which is the difference between the first traveling parameter and the third traveling parameter, by the second weighting coefficient, and the value generated by multiplying the third difference, which is the difference between the second traveling parameter and the third traveling parameter, by the third weighting coefficient. Similarly, when the first traveling parameter, second traveling parameter, third traveling parameter, and fourth traveling parameter are calculated as the traveling parameters of the same type, the determination unit 19 determines whether misrecognition is detected in the parameter group, which includes the first traveling parameter, second traveling parameter, third traveling parameter, and the fourth traveling parameter, using the value generated by multiplying the first difference, which is the difference between the first traveling parameter and the second traveling parameter, by the first weighting coefficient, the value generated by multiplying the second difference, which is the difference between the first traveling parameter and the third traveling parameter, by the second weighting coefficient, the value generated by multiplying the third difference, which is the difference between the second traveling parameter and the third traveling parameter, by the third weighting coefficient, the value generated by multiplying the fourth difference, which is the difference between the first traveling parameter and the fourth traveling parameter, by the fourth weighting coefficient, the value generated by multiplying the fifth difference, which is the difference between the second traveling parameter and the fourth traveling parameter, by the fifth weighting coefficient, and the value generated by multiplying the sixth difference, which is the difference between the third traveling parameter and the fourth traveling parameter, by the sixth weighting coefficient.

The misrecognition determination of traveling parameters is described in detail below using an example in which a plurality of curvatures of the traveling road is calculated as the traveling parameters of the same type.

Let $c1$ be the curvature based on the lane marking recognition data indicated by the captured information from the camera, let $c2$ be the curvature based on the preceding-vehicle motion trajectory data indicated by the image information from the camera and the detection information from the radar, let $c3$ be the curvature based on the map data from the navigation system 6, and let $k1$, $k2$, and $k3$ be weighting coefficients.

In this case, whether the curvature is correct, that is, the misrecognition of the curvature, is determined by determining whether expression (1) given below is satisfied.

$$Th > k1 \cdot |c1-c2| + k2 \cdot |c2-c3| + k3 \cdot |c3-c1| \qquad (1)$$

That is, the difference between the curvature $c1$ and the curvature $c2$ is multiplied by the weighting coefficient $k1$, the difference between the curvature $c2$ and the curvature $c3$ is multiplied by the weighting coefficient $k2$, and the difference between the curvature $c3$ and the curvature $c1$ is multiplied by the weighting coefficient $k3$ and, then, the resulting values are added up to calculate the evaluation value. Whether the curvatures $c1$, $c2$, and $c3$ are correct is determined by determining whether this evaluation value is smaller than the threshold $Th$.

If the evaluation value, calculated based on the traveling parameters and the weighting coefficients, is smaller than the threshold $Th$ and therefore expression (1) is satisfied, it is determined that the curvatures $c1$, $c2$, and $c3$ are correct values. On the other hand, if the evaluation value is not smaller than the threshold $Th$ and therefore expression (1) is not satisfied, it is determined that the parameter group, composed of the curvatures $c1$, $c2$, and $c3$, is incorrect and that misrecognition is detected. The threshold $Th$ may be a value that is set in advance in the ECU 10. Although the absolute value of the difference between curvatures is used in expression (1), the value generated by taking the root of the square of the difference between different curvatures, for example, $((c1-c2)^2)^{1/2}$, may be used. The weighting coefficients $k1$, $k2$, and $k3$ and the threshold $Th$, though positive values in expression (1), may be negative values. That is, the higher the orthogonality between the input data is, the larger the weighting coefficient is in the negative direction. In this case, whether the curvatures c1, c2, and c3 are correct is determined by determining whether the evaluation value is larger than the threshold Th with the direction of the inequality in expression (1) reversed.

The weighting coefficient is set according to the orthogonality between the input data corresponding to the traveling scene of the vehicle as described above. For example, the higher the orthogonality between the input data corresponding to the traveling scene of the vehicle is, the larger is set the weighting coefficient by which the difference between the traveling parameters based on the input data is multiplied.

For example, in expression (1), when the orthogonality between the lane marking recognition data and the preceding-vehicle motion trajectory data in a traveling scene is low (the lane marking recognition data and the preceding-vehicle motion trajectory data are easily misrecognized at the same time), the orthogonality between the lane marking recognition data and the map data is high (the lane marking recognition data and the map data are difficult to be misrecognized at the same time), and the orthogonality between the preceding-vehicle motion trajectory data and the map data is high (the preceding-vehicle motion trajectory data and the map data are difficult to be misrecognized at the same time), the weighting coefficients k2 and k3 are set larger than the weighting coefficient k1. In this case, when misrecognition occurs in both the lane marking recognition data and the preceding-vehicle motion trajectory data at the same time, the value of |c1−c2| becomes small and therefore it becomes difficult to determine in expression (1) that misrecognition occurs. However, because the values of |c2−c3| and |c3−c1| become large and, in addition, k2 and k3, by which these values are multiplied, are large, the values of k2·|c2−c3| and k3·|c3−c1| become large and therefore it is determined in expression (1) that misrecognition occurs. Therefore, even when a plurality of pieces of input data is misrecognized at the same time, the misrecognition of the traveling parameter group can be determined accurately.

In determining the misrecognition of traveling parameters, an expression other than expression (1) may be used as long as the expression can determine the misrecognition of traveling parameters using the values each generated by multiplying the difference between the traveling parameters by a weighting coefficient. Expression (1) given above, though applied to three traveling parameters, may be applied also to four or more traveling parameters. For example, when there are the first traveling parameter, the second traveling parameter, the third traveling parameter, and the fourth traveling parameter, it may be determined that misrecognition occurs in the parameter group, which includes at least the first traveling parameter, second traveling parameter, third traveling parameter, and the fourth traveling parameter, if the sum of the following values is not smaller than the pre-set threshold: that is, the value generated by multiplying the first difference, which is the difference between the first traveling parameter and the second traveling parameter, by the first weighting coefficient, the value generated by multiplying the second difference, which is the difference between the first traveling parameter and the third traveling parameter, by the second weighting coefficient, the value generated by multiplying the third difference, which is the difference between the second traveling parameter and the third traveling parameter, by the third weighting coefficient, the value generated by multiplying the fourth difference, which is the difference between the first traveling parameter and the fourth traveling parameter, by the fourth weighting coefficient, the value generated by multiplying the fifth difference, which is the difference between the second traveling parameter and the fourth traveling parameter, by the fifth weighting coefficient, and the value generated by multiplying the sixth difference, which is the difference between the third traveling parameter and the fourth traveling parameter, by the sixth weighting coefficient.

The external situation recognition unit 11, vehicle position recognition unit 12, traveling state recognition unit 13, travel plan generation unit 14, traveling control unit 15, traveling parameter calculation unit 16, difference calculation unit 17, weight setting unit 18, and determination unit 19 described above may be configured by installing the software or programs, which implement their functions, in the ECU 10. A part or all of them may be configured by individual electronic control units.

Next, the operation of the misrecognition determination device 1 according to an exemplary embodiment is described.

Figure 6:
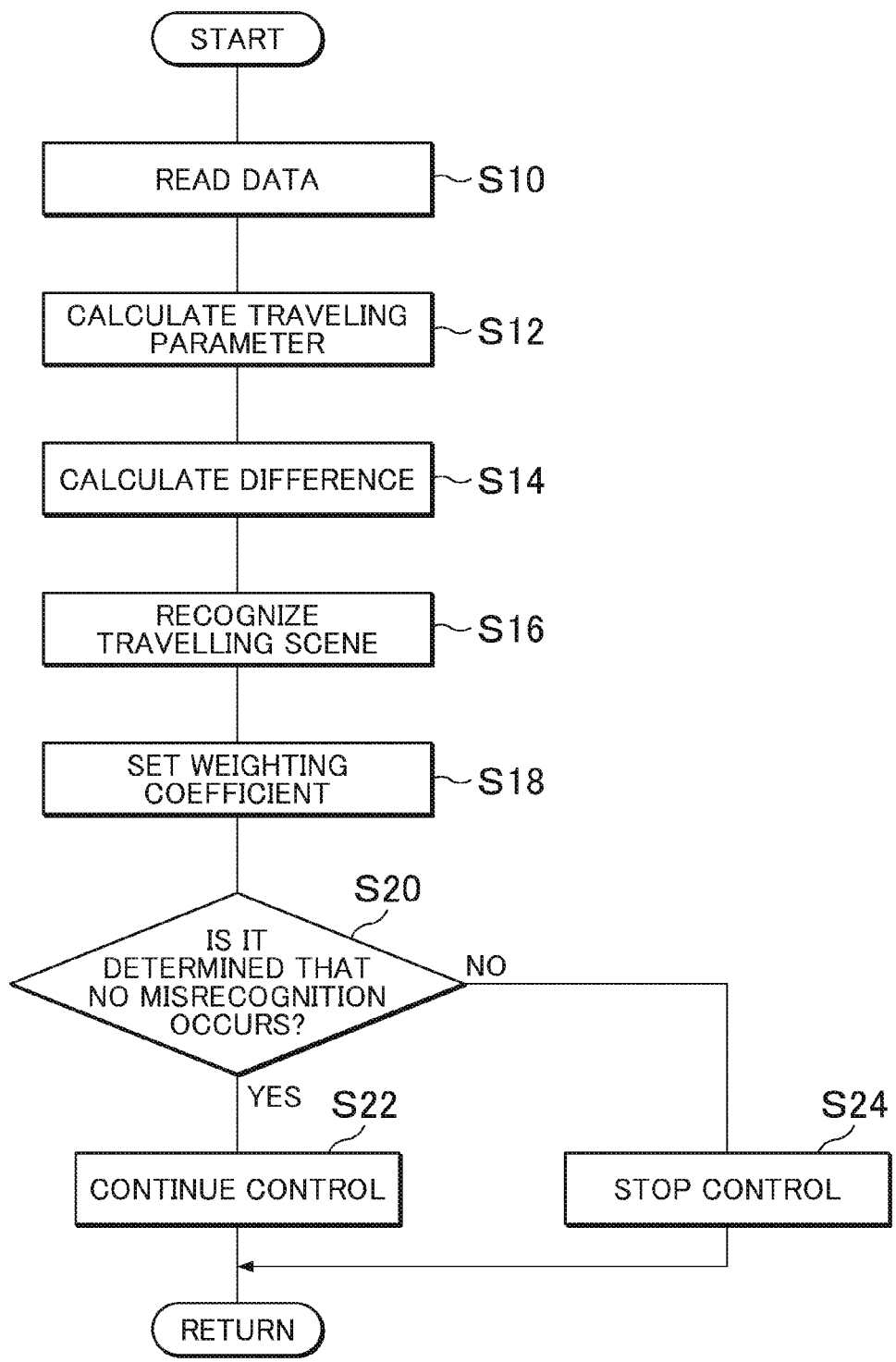
FIG. 6 is a flowchart showing the misrecognition determination processing performed by the misrecognition determination device shown in FIG. 1.

FIG. 6 is a flowchart showing the misrecognition determination processing performed by the misrecognition determination device 1 according to an exemplary embodiment. The misrecognition determination processing, usually performed when autonomous driving control is performed, is started at the same time autonomous driving control is started. This misrecognition determination processing is performed usually by the ECU 10 repeatedly at a predetermined periodic interval.

First, as shown in step S10 (hereinafter, the step is simply described in the form "S10" and this notation is used for other steps S) in FIG. 6, the sensor information read processing is performed. This processing reads the information from the external sensor 2, GPS reception unit 3, internal sensor 4, and navigation system 6. For example, as the sensor information from the external sensor 2, the captured information or the image information from the camera and the detection information from the radar are read. As the sensor information from the internal sensor 4, the vehicle speed information, steering angle information, and steering torque information on the vehicle, which is the host vehicle, are read. As the information from the navigation system 6, the vehicle position information and the lane information on the traveling road on which the vehicle is traveling are read.

After that, the processing proceeds to S12 to perform the traveling parameter calculation processing. This calculation processing calculates the traveling parameters, used for autonomous driving control, based on the input data. As the traveling parameters, the curvature and curvature change rate of the traveling road and the yaw angle and the offset of the vehicle are calculated.

To calculate the curvature, the lane markings are recognized from the image information captured by the camera and, based on the lane marking recognition data, the curvature is calculated. In addition, the preceding-vehicle motion trajectory is recognized from the image information captured by the camera and from the detection information detected by the radar and, based on the recognized preceding-vehicle motion trajectory data, the curvature is calculated. In addition, the current traveling position of the vehicle is recognized from the map information and from the vehicle position information and, based on the road data on that traveling position, the curvature is calculated. In this manner, a plurality of curvatures is calculated as a traveling parameter of the same type based on the different input data received from various information acquisition sources.

To calculate the curvature change rate, the lane markings are recognized from the image information captured by the camera and, based on the lane marking recognition data, the curvature change rate is calculated. In addition, the preceding-vehicle motion trajectory is recognized from the image information captured by the camera and from the detection information detected by the radar and, based on the recognized preceding-vehicle motion trajectory data, the curvature change rate is calculated. In addition, the current vehicle traveling position is recognized based on the map information and the vehicle position information and, based on the road data on that traveling position, the curvature change rate is calculated. In this manner, a plurality of curvature change rates is calculated as a traveling parameter of the same type based on the different input data received from various information acquisition sources.

To calculate the yaw angle, the lane markings are recognized from the image information captured by the camera and, based on the lane marking recognition data, the yaw angle is calculated. The yaw angle is calculated also based on the detection information detected by the yaw rate sensor. In addition, the yaw angle is calculated based on the detection information detected by the steering angle sensor or the steering torque sensor. In addition, the yaw angle may be calculated from the vehicle motion trajectory based on the map information and the vehicle position information. In this manner, a plurality of yaw angles is calculated as a traveling parameter of the same type based on the different input data received from various information acquisition sources.

To calculate the offset, the lane markings are recognized from the image information captured by the camera and, based on the lane marking recognition data, the offset is calculated. In addition, the vehicle motion trajectory is recognized based on the map information and the vehicle position information and, based on the motion trajectory data, the offset is calculated. In this manner, a plurality of offsets is calculated as a traveling parameter of the same type based on the different input data received from various information acquisition sources.

After that, the processing proceeds to S14 to perform the difference calculation processing. The difference calculation processing calculates the difference between the traveling parameters of the same type obtained from different input data. For example, when the traveling parameter is the curvature of the traveling road and when three traveling parameters, that is, the first traveling parameter that is the curvature based on the lane marking recognition data, the second traveling parameter that is the curvature based on the preceding-vehicle motion trajectory data, and the third traveling parameter that is the curvature based on the map data, are calculated, a first difference that is the difference between the first traveling parameter and the second traveling parameter, a second difference that is the difference between the first traveling parameter and the third traveling parameter, and a third difference that is the difference between the second traveling parameter and the third traveling parameter are calculated.

After that, the processing proceeds to S16 to perform the traveling scene recognition processing. The traveling scene recognition processing recognizes the traveling scene of the vehicle. For example, the traveling scene recognition processing recognizes what the current traveling scene of the vehicle is, based on the map information, vehicle position information, and the detection information detected by the external sensor 2, and determines whether the current traveling scene is a pre-set particular traveling scene. If the scene is not a particular traveling scene, the scene is recognized as a usual traveling scene. A pre-set particular traveling scene is a traveling scene in which a plurality of pieces of input data for calculating a plurality of traveling parameters is easily misrecognized at the same time. A usual traveling scene is a traveling scene in which a plurality of pieces of input data is not easily misrecognized at the same time. For example, when the traveling parameter is the curvature of a lane, the pre-set particular traveling scenes include a traveling scene near a branch of the traveling road (see FIG. 2), a traveling scene near a tunnel exit (see FIG. 3), a traveling scene in a city area (FIG. 4), and a traveling scene in which the preceding vehicle is traveling to the side of a large-sized car (see FIG. 5).

After that, the processing proceeds to S18 to perform the weight setting processing. The weight setting processing sets a weighting coefficient according to the orthogonality between one piece of input data and another piece of input data in the traveling situation of the vehicle. For example, when there are three pieces of input data, that is, first input data, second input data, and third input data, the following three weighting coefficients are set: a first weighting coefficient according to the orthogonality between the first input data and the second input data in the traveling scene of the vehicle, a second weighting coefficient according to the orthogonality between the first input data and the third input data in the traveling scene, and a third weighting coefficient according to the orthogonality between the second input data and the third input data in the traveling situation. The first weighting coefficient is a weighting coefficient by which the difference between the first traveling parameter based on the first input data and the second traveling parameter based on the second input data is multiplied. The second weighting coefficient is a weighting coefficient by which the difference between the first traveling parameter based on the first input data and the third traveling parameter based on the third input data is multiplied. The third weighting coefficient is a weighting coefficient by which the difference between the second traveling parameter based on the second input data and the third traveling parameter based on the third input data is multiplied.

In the weight setting processing, the higher the orthogonality between the input data in a traveling scene of the vehicle is, the larger the weighting coefficient is set. For example, when there are three pieces of input data, that is, first input data, second input data, and third input data and when the orthogonality between the first input data and the second input data in the traveling scene of the vehicle is higher than the orthogonality between the first input data and the third input data, the first weighting coefficient is set larger than the second weighting coefficient. When the traveling scene of the vehicle is a usual traveling scene (a traveling scene in which a plurality of pieces of input data or traveling parameters is not misrecognized at the same time), the orthogonality between the input data is almost the same and therefore the same value may be used for the weighting coefficients.

After that, the processing proceeds to S20 to determine whether misrecognition occurs in the traveling parameters. This determination processing determines whether misrecognition occurs in a plurality of traveling parameters of the same type such as the curvature, that is, whether misrecognition occurs in the parameter group. For example, when the determination is made for the first traveling parameter, second traveling parameter, and third traveling parameter that are the traveling parameters of the same type, the determination processing determines whether misrecognition occurs in the parameter group, using the value generated by multiplying the first difference, which is the difference between the first traveling parameter and the second traveling parameter, by the first weighting coefficient, the value generated by multiplying the second difference, which is the difference between the first traveling parameter and the third traveling parameter, by the second weighting coefficient, and the value generated by multiplying the third difference, which is the difference between the second traveling parameter and the third traveling parameter, by the third weighting coefficient. The weighting coefficients are those that are set according to the traveling scene of the vehicle.

More specifically, using expression (1) given above, the sum of the value generated by multiplying the first difference by the first weighting coefficient, the value generated by multiplying the second difference by the second weighting coefficient, and the value generated by multiplying the third difference by the third weighting coefficient is calculated and, then, the determination is made whether misrecognition occurs in the parameter group by determining whether the value of the sum is smaller than the pre-set threshold. That is, if the sum of the values, each generated by multiplying the difference between the traveling parameters by the weighting coefficient, is smaller than the threshold, it is determined that no misrecognition occurs in the parameter group. On the other hand, if the sum of the values, each generated by multiplying the difference between the traveling parameters by the weighting coefficient, is not smaller than the threshold, it is determined that misrecognition occurs in the parameter group.

Although the determination is made in expression (1) whether the sum is smaller than the threshold, the determination may also be made whether the sum is equal to or smaller than the threshold. The misrecognition determination may also be made using a determination expression other than expression (1). In addition, when there are four or more traveling parameters of the same type, the number of values, each generated by multiplying the difference by the weighting coefficient, may be increased according to the number of traveling parameters with the threshold being set according to the number of traveling parameters. Expression (1) is an expression to perform misrecognition determination for the curvature; for other traveling parameters, an expression of the similar format may be used to perform misrecognition determination.

If it is determined in S20 that no misrecognition occurs in the parameter group of traveling parameters, the control continuation processing is performed (S22). This control continuation processing causes the vehicle control processing to be continued. For example, the processing for turning on the control continuation flag is performed. This processing allows the currently performed vehicle control, such as autonomous driving control, to be continued.

On the other hand, if it is determined in S20 that misrecognition occurs in the parameter group of traveling parameters, the control stop processing is performed (S24). This control stop processing causes the vehicle control processing to be terminated. For example, the processing for turning on the control stop flag is performed. This processing causes the currently performed vehicle control, such as autonomous driving control, to be stopped. The vehicle control may be stopped after continuing the control using the previous values of the traveling parameters. In addition, the information indicating that misrecognition may possibly occur in the control may be notified to the vehicle occupants. In addition to that information, the information may be sent to notify the driver to hold the steering wheel or a supposed trajectory of the vehicle may be displayed. It is also possible to predict the time to the moment the control amount will reach the maximum, to change the output of the HMI 7 according to the predicted time, and to issue an alert or a warning. After the processing in S22 or S24, a series of control processing is terminated.

In a series of traveling control processing shown in FIG. 6, a part of the execution of the control processing may be omitted, the order of the control processing may be changed, or other control processing may be added as long as the control result is not affected.

According to the misrecognition determination processing shown in FIG. 6, the weighting coefficients are set according to the orthogonality between different input data in a traveling scene (traveling situation) of the vehicle and, using the values each generated by multiplying the difference between traveling parameters based on the input data by the weighting coefficient, the determination is made whether misrecognition occurs in the plurality of traveling parameters as described above. Therefore, considering that the traveling parameters, which differ among traveling scenes of the vehicle, are difficult to be misrecognized at the same time, the misrecognition determination of the traveling parameters can be performed accurately.

In addition, the higher the orthogonality between the input data is in a traveling scene of the vehicle, the larger is set the weighting coefficient and, using the weighting coefficients that are set in this manner, the misrecognition of the traveling parameters is determined. Therefore, the misrecognition of traveling parameters can be determined more accurately for each of the traveling scenes of the vehicle.

Figure 7:
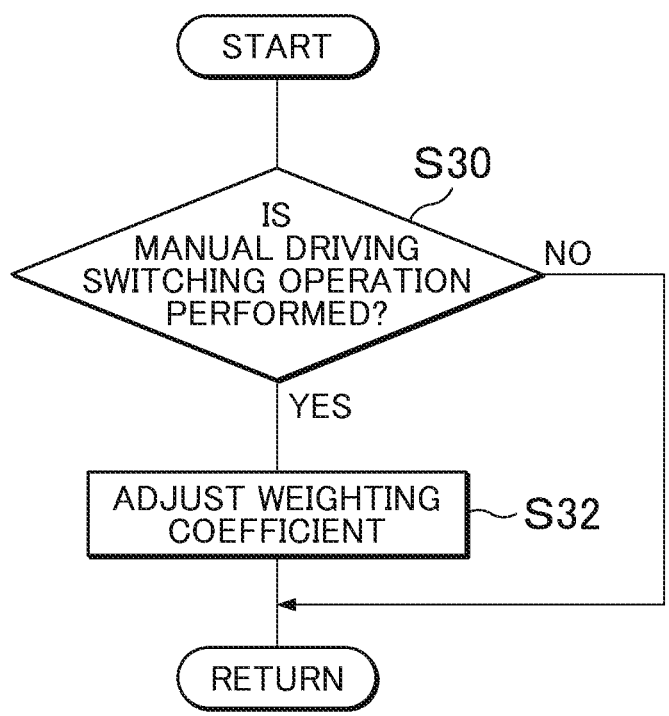
FIG. 7 is a flowchart showing the weighting coefficient adjustment processing performed by the misrecognition determination device shown in FIG. 1.

FIG. 7 is a flowchart showing the weighting coefficient adjustment processing performed by the misrecognition determination device 1 according to an exemplary embodiment. The weighting coefficient adjustment processing is the processing for updating or learning the weighting coefficients used for the misrecognition determination of the traveling parameters. This weighting coefficient adjustment processing is performed while autonomous driving control is performed or after autonomous driving control is terminated. This weighting coefficient adjustment processing, usually performed by the ECU 10, may be performed repeatedly during autonomous driving control at a predetermined periodic interval or may be performed based on the data used during the control when autonomous driving control is terminated.

First, as shown in S30 in FIG. 7, a determination is made whether the manual driving switching operation is performed during the driving control of the vehicle. This determination processing determines whether an occupant of the vehicle performs the manual driving switching operation during the driving control of the vehicle. For example, a determination is made whether the autonomous driving control is stopped and the driving is switched to the manual driving through the manual driving operation such as the steering wheel operation by the driver during the driving control of the vehicle. The manual driving switching operation may be the manual driving operation, such as the operation on the steering wheel, or the operation on the manual driving switching button.

If it is determined in S30 that the manual driving switching operation is not performed during the driving control of the vehicle, the control processing is terminated. In this case, the weighting coefficients are not adjusted or reset. On the other hand, if it is determined in S30 that the manual driving switching operation is performed during the driving control of the vehicle, the weighting coefficient adjustment processing is performed (S32). This adjustment processing updates and learns the weighting coefficients so that the vehicle control using the traveling parameters is performed more appropriately. The weighting coefficients are reset so that the misrecognition of the parameter group of the traveling parameters is determined more easily than when the manual driving switching operation is not performed. For example, when the first traveling parameter, second traveling parameter, and third traveling parameter are used in the driving control, the first weighting coefficient, second weighting coefficient, and third weighting coefficient are used as the weighting coefficients each of which is a weighting coefficient by which the difference between the traveling parameters is multiplied. In this case, at least one of the first weighting coefficient, second weighting coefficient, and third weighting coefficient is adjusted.

More specifically, the adjustment is made in such a way that the weighting coefficient, by which the difference between two traveling parameters that are any two of the first traveling parameter, second traveling parameter, and third traveling parameter and that have a similar value is multiplied, is decreased and that the other weighting coefficients are increased. Instead, the adjustment may be made in such a way that the weighting coefficients, by which the difference corresponding to the traveling parameter having the most different value is multiplied, are increased. By making the adjustment as described above, the values each generated by multiplying the difference between the traveling parameters by the weighting coefficient can be increased and, in determining the misrecognition of the traveling parameters based on the magnitude of those values, the misrecognition determination can be performed more accurately. After the processing in S32, a series of control processing is terminated.

According to the weighting coefficient adjustment processing in FIG. 7, when it is determined that the manual driving switching operation is performed during the driving control of the vehicle, the weighting coefficients are adjusted as described above so that the misrecognition of traveling parameters is easily determined. This adjustment allows the misrecognition of traveling parameters to be determined more accurately, increasing accuracy in the misrecognition determination of traveling parameters.

Figure 8:
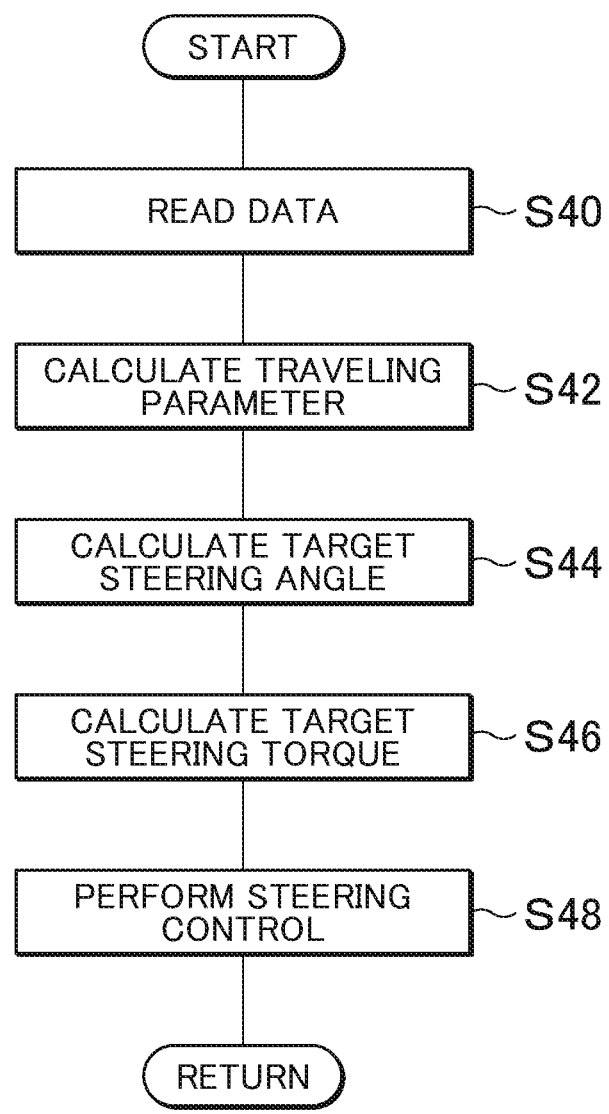
FIG. 8 is a flowchart showing the steering control processing performed as driving control.

FIG. 8 is a flowchart showing the steering control processing performed in a vehicle on which the misrecognition determination device 1 according to an exemplary embodiment is mounted. The steering control processing, the processing for controlling the steering of the vehicle, is performed as part of the autonomous driving control of the vehicle. This steering control processing is started, for example, at the same time autonomous driving control is started. This steering control processing is performed usually by the ECU 10 repeatedly at a predetermined periodic interval.

First, as shown in S40 in FIG. 8, the sensor information read processing is performed. This processing reads the information from the external sensor 2, GPS reception unit 3, internal sensor 4, and navigation system 6. For example, as the sensor information from the external sensor 2, the captured information or the image information from the camera and the detection information from the radar are read. As the sensor information from the internal sensor 4, the vehicle speed information, steering angle information, and steering torque information on the vehicle, which is the host vehicle, are read. As the information from the navigation system 6, the vehicle position information and the lane information on the traveling road on which the vehicle is traveling are read.

Next, the processing proceeds to S42 to perform the traveling parameter calculation processing. This calculation processing calculates the traveling parameters used for autonomous driving control. For example, the traveling parameters include the curvature and the curvature change rate of the traveling road and the yaw angle and the offset of the vehicle. This calculation processing may be performed similarly to the calculation processing in S12 in FIG. 6. The traveling parameters that are calculated in this step and are determined not to be misrecognized are used for steering control. The misrecognition determination of traveling parameters is performed by the misrecognition determination processing shown in FIG. 6.

Next, the processing proceeds to S44 to perform the target steering angle calculation processing. This calculation processing calculates the target steering angle of the vehicle. For example, the target steering angle is calculated based on the curvature and the curvature change rate of the traveling road and the yaw angle and the offset of the vehicle all of which are traveling parameters. After that, the processing proceeds to the processing in S46 to perform the target steering torque calculation processing. This calculation processing calculates the steering torque, required for implementing the target steering angle of the vehicle, as the target steering torque. A known method may be used for the calculation method in S44 and S46.

Next, the processing proceeds to the processing in S48 to perform the steering control processing. The steering control processing, the processing for controlling the steering of the vehicle, outputs the calculated target steering torque information from the ECU 10 to the actuator 8 as the control signal. This causes the steering operation of the vehicle to be performed according to the target steering torque. After the processing in S48, a series of the control processing in FIG. 8 is terminated.

The steering control processing, such as the one shown in FIG. 8, allows the steering control processing of the vehicle to be performed using traveling parameters such as the curvature. This steering control processing, which is an example of the control processing of the vehicle, may be applied to other vehicle control processing if the vehicle is controlled using traveling parameters.

As described above, the misrecognition determination device 1 according to an exemplary embodiment sets weighting coefficients according to the orthogonality between different input data in a traveling situation of the vehicle and, using the values each generated by multiplying the difference between the traveling parameters based on the input data by the weighting coefficient, determines the misrecognition of the traveling parameters. Therefore, the weighting coefficients may be set, considering that the input data, which differ among traveling scenes of the vehicle, are difficult to be misrecognized at the same time. This allows the misrecognition of traveling parameters to be determined more accurately.

The misrecognition determination device 1 sets weighting coefficients in such a way that the higher the orthogonality between input data in a traveling scene of the vehicle is, the larger is set the weighting coefficient, and determines the misrecognition of traveling parameters using the weighting coefficients. Therefore, this allows the misrecognition of the traveling parameters in the traveling scene of the vehicle to be determined more accurately. That is, even if misdetection or misrecognition occurs in a plurality of sensors at the same time due to a traveling scene, the incorrect recognition can be determined accurately.

When the manual driving switching operation is performed during the driving control of the vehicle, the misrecognition determination device 1 adjusts or resets at least one of the first weighting coefficient, second weighting coefficient, and third weighting coefficient so that the determination unit can determine more easily that misrecognition occurs than when the manual driving switching operation is not performed. As a result, when the manual driving switching operation is performed and there is a possibility that the driving control is not performed as intended by the driver, the determination unit can determine more easily that misrecognition occurs in the traveling parameter group. Therefore, the misrecognition determination of the traveling parameters can be made more accurately according to the traveling situation with the result that accuracy in the misrecognition determination of the traveling parameters is increased.

While a misrecognition determination device according to an aspect of an exemplary embodiment has been described, it is to be understood that the misrecognition determination device is not limited thereto. For example, the misrecognition determination device may be modified, or may be applied to other units, and remain within the scope of the appended claims.

What is claimed is:

1. A misrecognition determination device comprising one or more processors configured to:
   calculate at least a first traveling parameter that is used for driving control of a vehicle and is based on a first input data, a second traveling parameter that is used for driving control of the vehicle and is based on a second input data, and a third traveling parameter that is used for driving control of the vehicle and is based on a third input data;
   calculate at least a first difference that is a difference between the first traveling parameter and the second traveling parameter, a second difference that is a difference between the first traveling parameter and the third traveling parameter, and a third difference that is a difference between the second traveling parameter and the third traveling parameter;
   calculate at least a first weighting coefficient, a second weighting coefficient, and a third weighting coefficient, the first weighting coefficient corresponding to an orthogonality between the first input data and the second input data in a traveling situation of the vehicle, the second weighting coefficient corresponding to an orthogonality between the first input data and the third input data in the traveling situation of the vehicle, and the third weighting coefficient corresponding to an orthogonality between the second input data and the third input data in the traveling situation of the vehicle, such that a higher weighting coefficient corresponds to a higher orthogonality;
   calculate a first value generated by multiplying the first difference by the first weighting coefficient, a second value generated by multiplying the second difference by the second weighting coefficient, and a third value generated by multiplying the third difference by the third weighting coefficient;
   determine whether a misrecognition has occurred in a parameter group that includes at least the first traveling parameter, the second traveling parameter, and the third traveling parameter using the first value, the second value, and the third value;
   output a result of the determination; and
   continue the driving control of the vehicle based upon the determination that no misrecognition has occurred, and stop the driving control of the vehicle based upon the determination that misrecognition has occurred.

2. The misrecognition determination device according to claim 1, wherein the one or more processors are further configured to reset at least one of the first weighting coefficient, the second weighting coefficient, and the third weighting coefficient in response to a manual driving switching operation being performed during driving control of the vehicle.

3. The misrecognition determination device according to claim 1, wherein the one or more processors are further configured to:
   determine whether a sum of the first value, the second value, and the third value is less than a predetermined threshold; and
   in response to determining that the sum of the first value, the second value, and the third value is less than the predetermined threshold, determine that the misrecognition has occurred in the parameter group that includes at least the first traveling parameter, the second traveling parameter, and the third traveling parameter.

4. The misrecognition determination device according to claim 1, wherein the one or more processors are further configured to:
   calculate a fourth traveling parameter, used for driving control of the vehicle, based on a fourth input data;
   calculate at least the first difference, the second difference, the third difference, a fourth difference that is a difference between the first traveling parameter and the fourth traveling parameter, a fifth difference that is a difference between the second traveling parameter and the fourth traveling parameter, and a sixth difference that is a difference between the third traveling parameter and the fourth traveling parameter;
   calculate at least the first weighting coefficient, the second weighting coefficient, the third weighting coefficient, a fourth weighting coefficient corresponding to an orthogonality between the first input data and the fourth input data in the traveling situation of the vehicle, a fifth weighting coefficient corresponding to an orthogonality between the second input data and the fourth input data in the traveling situation of the vehicle, and a sixth weighting coefficient corresponding to an orthogonality between the third input data and the fourth input data in the traveling situation of the vehicle;
   calculate a fourth value generated by multiplying the fourth difference by the fourth weighting coefficient, a fifth value generated by multiplying the fifth difference by the fifth weighting coefficient, and a sixth value generated by multiplying the sixth difference by the sixth weighting coefficient; and
   determine whether the misrecognition has occurred in a parameter group that includes at least the first traveling parameter, the second traveling parameter, the third traveling parameter, and the fourth traveling parameter using the first value, the second value, the third value, the fourth value, the fifth value, and the sixth value.

5. The misrecognition determination device according to claim 4, wherein the one or more processors are further configured to:

determine whether a sum of the first value, the second value, the third value, the fourth value, the fifth value, and the sixth value is less than a predetermined threshold; and in response to determining that the sum of the first value, the second value, the third value, the fourth value, the fifth value, and the sixth value is less than the predetermined threshold, determine that the misrecognition has occurred in the parameter group that includes at least the first traveling parameter, the second traveling parameter, the third traveling parameter, and the fourth traveling parameter.

6. A method of identifying a misrecognition event of one or more sensors of a vehicle, the method comprising:

receiving a first input data from a first input sensor, a second input data from a second input sensor, and a third input data from a third input sensor;

calculating a first traveling parameter using the first input data, a second traveling parameter using the second input data, and a third traveling parameter using the third input data, wherein the first, second, and third traveling parameters are used for driving control of the vehicle;

calculating a first difference corresponding to a difference between the first traveling parameter and the second traveling parameter, a second difference corresponding to a difference between the first traveling parameter and the third traveling parameter, and a third difference corresponding to a difference between the second traveling parameter and the third traveling parameter;

calculating a first weighting coefficient corresponding to an orthogonality between the first input data and the second input data in a traveling situation of the vehicle, a second weighting coefficient corresponding to an orthogonality between the first input data and the third input data in the traveling situation of the vehicle, and a third weighting coefficient corresponding to an orthogonality between the second input data and the third input data in the traveling situation of the vehicle;

calculating a first value corresponding to a product of the first difference and the first weighting coefficient, a second value corresponding to a product of the second difference and the second weighting coefficient, and a third value corresponding to a product of the third difference and the third weighting coefficient;

identifying whether a misrecognition event has occurred for one or more of the first input sensor, the second input sensor, and the third input sensor based on a sum of the first value, the second value, and the third value; and continuing the driving control of the vehicle based upon the identification that the misrecognition event has not occurred, and stopping the driving control of the vehicle based upon the identification that the misrecognition event has occurred.

7. The method of claim 6, wherein the identifying the misrecognition event comprises:

determining whether the sum of the first value, the second value, and the third value is less than a predetermined threshold; and in response to determining that the sum of the first value, the second value, and the third value is less than the predetermined threshold, determining that the misrecognition event has occurred.

8. The method of claim 7, further comprising outputting a signal indicating that the misrecognition event has occurred.

9. The method of claim 8, wherein the traveling situation of the vehicle is one of: approaching a branch in a roadway, approaching a tunnel exit, traveling in a city area, or traveling behind another vehicle wherein the other vehicle is adjacent to a third vehicle larger than the other vehicle.

10. The method of claim 9, wherein the receiving the first input data from the first input sensor comprises receiving the first input data from one of a camera, a radar, or a Laser Imaging Detection and Ranging (LIDAR) device.

* * * * *